United States Patent
Choi

(10) Patent No.: US 12,139,942 B2
(45) Date of Patent: Nov. 12, 2024

(54) VEHICLE DOOR OPENING AND CLOSING APPARATUS

(71) Applicants: Hyundai Motor Company, Seoul (KR); Kia Corporation, Seoul (KR)

(72) Inventor: Je Won Choi, Anyang-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 7 days.

(21) Appl. No.: 17/932,428

(22) Filed: Sep. 15, 2022

(65) Prior Publication Data

US 2023/0340808 A1   Oct. 26, 2023

(30) Foreign Application Priority Data

Apr. 22, 2022   (KR) .......................... 10-2022-0050241

(51) Int. Cl.
| | |
|---|---|
| *E05B 85/00* | (2014.01) |
| *B60J 5/04* | (2006.01) |
| *E05B 79/08* | (2014.01) |
| *E05B 83/40* | (2014.01) |
| *E05B 85/02* | (2014.01) |
| *E05B 85/04* | (2014.01) |
| *E05B 85/24* | (2014.01) |
| *B60J 5/06* | (2006.01) |

(52) U.S. Cl.
CPC .............. *E05B 83/40* (2013.01); *B60J 5/047* (2013.01); *E05B 79/08* (2013.01); *E05B 85/02* (2013.01); *E05B 85/045* (2013.01); *E05B 85/243* (2013.01); *B60J 5/06* (2013.01)

(58) Field of Classification Search
CPC .......... E05B 83/40; E05B 79/08; E05B 85/02; E05B 85/045; E05B 85/243; B60J 5/047; B60J 5/06
See application file for complete search history.

(56) References Cited

U.S. PATENT DOCUMENTS

| | | | | |
|---|---|---|---|---|
| 4,575,138 A | * | 3/1986 | Nakamura | ............ E05B 77/265 292/216 |
| 8,646,208 B2 | * | 2/2014 | Taracko | ................... B60J 5/047 49/155 |
| 2021/0140215 A1 | | 5/2021 | Choi | |

FOREIGN PATENT DOCUMENTS

| | | | | |
|---|---|---|---|---|
| EP | 1279784 A1 | * | 1/2003 | ......... E05B 47/0009 |
| KR | 1020210057616 A | | 5/2021 | |

OTHER PUBLICATIONS

Translation of EP document. (Year: 2003).*

* cited by examiner

*Primary Examiner* — Daniel J Troy
*Assistant Examiner* — Daniel Alvarez
(74) *Attorney, Agent, or Firm* — Slater Matsil, LLP

(57) ABSTRACT

In accordance with an embodiment, a vehicle door opening and closing apparatus includes: a main latch mounted on a vehicle door, and including a catch rotating around a shaft extending in a height direction of a vehicle; and a main striker mounted on a vehicle body, and including a rod extending in the height direction of the vehicle.

20 Claims, 33 Drawing Sheets

VEHICLE DOOR OPENING AND CLOSING APPARATUS

CROSS-REFERENCE TO RELATED APPLICATIONS

This application claims the benefit of priority to Korean Patent Application No. 10-2022-0050241, filed on Apr. 22, 2022, which application is hereby incorporated herein by reference.

TECHNICAL FIELD

The present disclosure relates to a vehicle door opening and closing apparatus.

BACKGROUND

Vehicles have door apertures for ingress and egress of passengers to and from a passenger compartment. A vehicle door is closed to cover the door aperture and is opened to enable ingress and egress of passengers to and from the passenger compartment through the door aperture. Vehicle doors are divided into swing doors and sliding doors. The swing door is opened and closed by swinging around a hinge mounted between the swing door and the vehicle body. The sliding door is opened and closed by sliding a roller mounted on the sliding door along a rail mounted on the vehicle body.

The swing door is very easy to open and close, thereby enabling quick ingress and egress of passengers. However, when the swing door is opened, a space for ingress and egress is relatively small. When the vehicle is located in a narrow space, a swing trajectory of the door is not secured, which makes the opening and closing operation thereof difficult.

The sliding door is very easy to open and close even when the vehicle is located in a narrow space. When the sliding door is opened, a space for ingress and egress is relatively large. However, the sliding door requires relatively much force and time to open and close, which hinders quick ingress and egress of passengers.

According to the related art, as a vehicle door is operated by a single opening and closing method, it may be difficult to adequately respond to the needs of users seeking ease of use, diversity, and novelty.

The above information described in this background section is provided to assist in understanding the background of the inventive concept, and may include any technical concept which is not considered as the prior art that is already known to those skilled in the art.

SUMMARY

The present disclosure has been made to solve the above-mentioned problems occurring in the prior art while advantages achieved by the prior art are maintained intact.

An aspect of the present disclosure provides a vehicle door opening and closing apparatus designed to have a structure in which a catch of a main latch rotates around an axis extending in a height direction (that is, vertical direction) of the vehicle and a rod of a main striker extends in the height direction (that is, vertical direction) of the vehicle so that the catch and the rod may be aligned perpendicular to both a swing trajectory and a sliding trajectory, thereby allowing a vehicle door to stably open and close in any one mode selected from a swing mode and a sliding mode.

According to an aspect of the present disclosure, a vehicle door opening and closing apparatus may include: a main latch mounted on a vehicle door, and including a catch rotating around a shaft extending in a height direction of a vehicle; and a main striker mounted on a vehicle body, and including a rod extending in the height direction of the vehicle.

The vehicle door may be selectively opened and closed in any one of a sliding mode and a swing mode so that the vehicle door may uncover and cover a door opening of the vehicle body.

A longitudinal axis of the shaft may be parallel to a longitudinal axis of the rod.

The main latch may include a lever operatively connected to the catch, and the lever may rotate around a lever pin.

A longitudinal axis of the lever pin may be parallel to a longitudinal axis of the shaft.

The catch may have a locking shoulder and a slot in which the rod is received, and the lever may have a locking projection releasably engaging with the locking shoulder.

The catch may be rotatable between an upper support plate and a lower support plate.

The shaft may be mounted on the upper support plate and the lower support plate.

Each of the upper support plate and the lower support plate may have a plane perpendicular to a longitudinal axis of the shaft.

The main striker may include an upper extension portion connected to an upper end of the rod, a lower extension portion connected to a lower end of the rod 191, and a mounting plate to which the upper extension portion and the lower extension portion are fixed.

The vehicle door may have a recessed surface which is recessed from a peripheral face of the vehicle door toward the interior of the vehicle door, a recessed space may be defined between the peripheral face and the recessed surface, and a portion of the catch may protrude from the recessed surface, and be located in the recessed space.

The vehicle door opening and closing apparatus may further include a protector covering or uncovering the recessed space.

The protector may include a first cover pivotally connected to an edge of the recessed surface, a second cover pivotally connected to the first cover, and a pair of guides guiding a movement of the second cover.

A first end portion of the second cover may be pivotally connected to the first cover through a second pivot pin, a guide pin may be provided on a second end portion of the second cover, and the guide pin may be guided along the pair of guides.

Each guide may have a guide slot guiding a corresponding end portion of the guide pin.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION OF ILLUSTRATIVE EMBODIMENTS

Figure 1:
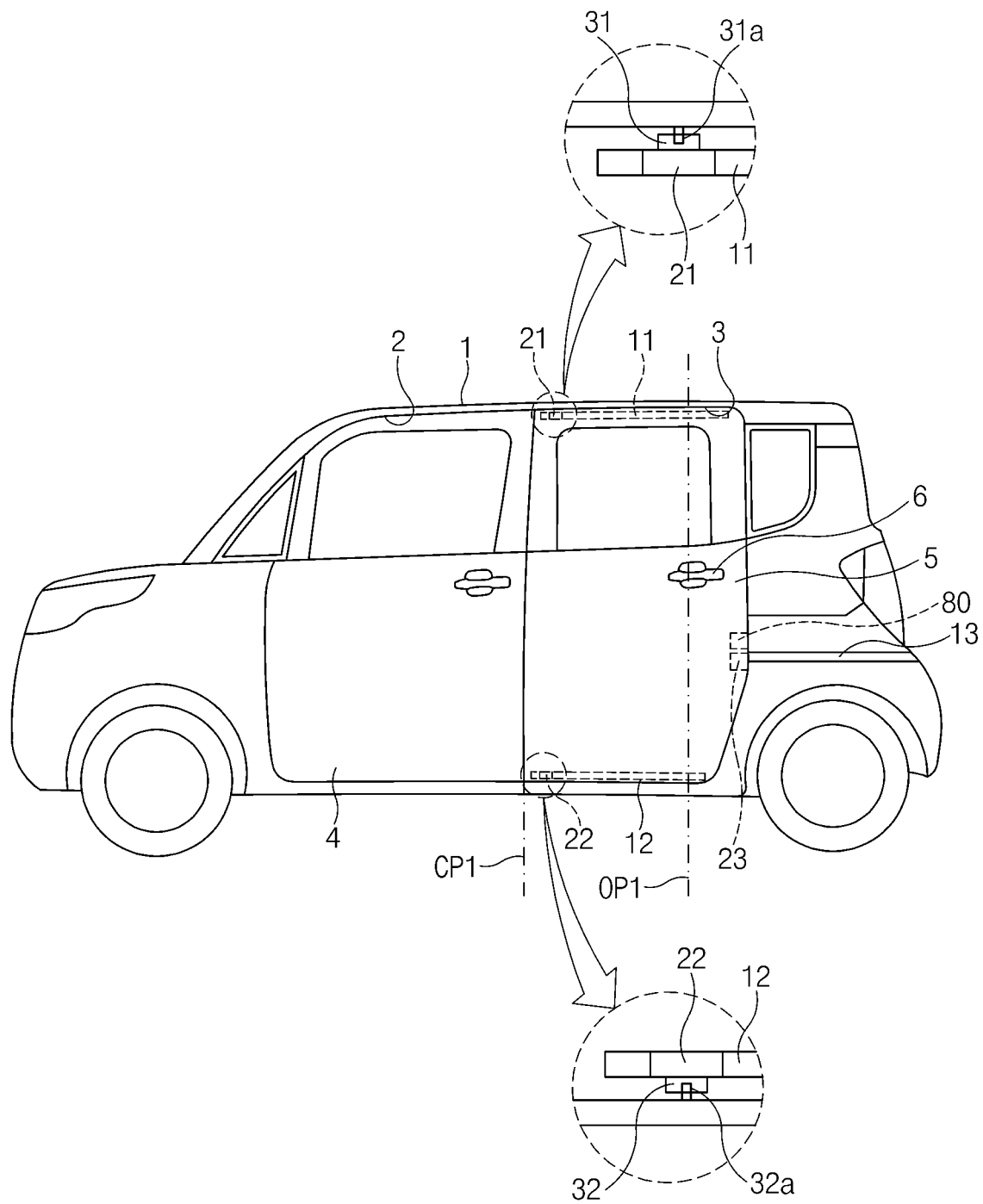
FIG. 1 illustrates a vehicle door opening and closing apparatus according to an exemplary embodiment of the present disclosure, which is mounted on a rear door of a vehicle.

Hereinafter, exemplary embodiments of the present disclosure will be described in detail with reference to the accompanying drawings. In the drawings, the same reference numerals will be used throughout to designate the same or equivalent elements. In addition, a detailed description of well-known techniques associated with the present disclosure will be ruled out in order not to unnecessarily obscure the gist of the present disclosure.

Terms such as first, second, A, B, (a), and (b) may be used to describe the elements in exemplary embodiments of the present disclosure. These terms are only used to distinguish one element from another element, and the intrinsic features, sequence or order, and the like of the corresponding elements are not limited by the terms. Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

The present disclosure relates to a vehicle door opening and closing apparatus allowing a vehicle door to open and close in any one mode selected from a swing mode and a sliding mode, and more particularly, to a vehicle door opening and closing apparatus designed to have a structure in which a catch of a main latch rotates around a vertically extending rotation axis and a rod of a main striker extends vertically so that the catch and the rod may be aligned perpendicular to both a swing trajectory and a sliding trajectory, thereby allowing a vehicle door to stably open and close in any one mode selected from a swing mode and a sliding mode.

A vehicle door opening and closing apparatus, according to exemplary embodiments of the present disclosure, may allow a vehicle door to open and close selectively in any one mode of a sliding mode and a swing mode. In other words, the vehicle door opening and closing apparatus, according to exemplary embodiments of the present disclosure, may be a transform-type door opening and closing apparatus. The sliding mode may allow the vehicle door to open and close by sliding in a longitudinal direction of a vehicle, and the swing mode may allow the vehicle door to open and close by swinging inwards and outwards.

Referring to FIG. 1, a vehicle body 1 may have a plurality of door apertures 2 and 3, and the plurality of door apertures 2 and 3 may be divided into a front aperture 2 and a rear aperture 3. A plurality of vehicle doors 4 and 5 may include a front door 4 covering and uncovering the front aperture 2, and a rear door 5 covering and uncovering the rear aperture 3. As the front door 4 is opened, the front door 4 may uncover the front aperture 2, and as the front door 4 is closed, the front door 4 may cover the front aperture 2. As the rear door 5 is opened, the rear door 5 may uncover the rear aperture 3, and as the rear door 5 is closed, the rear door 5 may cover the rear aperture 3.

The vehicle door opening and closing apparatus, according to exemplary embodiments of the present disclosure, may be applied to the front door 4, the rear door 5, and the like. FIGS. 1 to 4 illustrate a vehicle door opening and closing apparatus according to exemplary embodiments of the present disclosure, which is applied to the rear door 5. Hereinafter, the rear door 5 will be referred to as the vehicle door 5, and the rear aperture 3 will be referred to as the door aperture 3.

The vehicle door opening and closing apparatus, according to exemplary embodiments of the present disclosure, may include one or more rails 11 and 12 mounted on the vehicle body 1, and the rails 11 and 12 may extend in the longitudinal direction of the vehicle. Referring to FIG. 1, an upper rail 11 may be mounted on an upper edge of the vehicle body 1, and a lower rail 12 may be mounted on a lower edge of the vehicle body 1. The upper rail 11 and the lower rail 12 may extend in the longitudinal direction of the vehicle. The upper rail 11 may be disposed on an upper edge of the door aperture 3, and the lower rail 12 may be disposed on a lower edge of the door aperture 3.

The vehicle door opening and closing apparatus, according to exemplary embodiments of the present disclosure, may include roller units 21 and 22 guided along the rails 11 and 12. The roller units 21 and 22 may allow the vehicle door 5 to open and close in one mode selected from the sliding mode and the swing mode. In particular, the roller units 21 and 22 may be releasably held in predetermined positions of the rails 11 and 12 by hold locks 31 and 32. Specifically, when the roller units 21 and 22 are held in the predetermined positions of the rails 11 and 12 by the hold locks 31 and 32, the vehicle door 5 may be opened and closed in the swing mode in which the vehicle door swings in the predetermined positions of the rails 11 and 12. When the roller units 21 and 22 are released by the hold locks 31 and 32, the vehicle door 5 may be opened and closed in the sliding mode in which the vehicle door slides along the rails 11 and 12.

Figure 3:
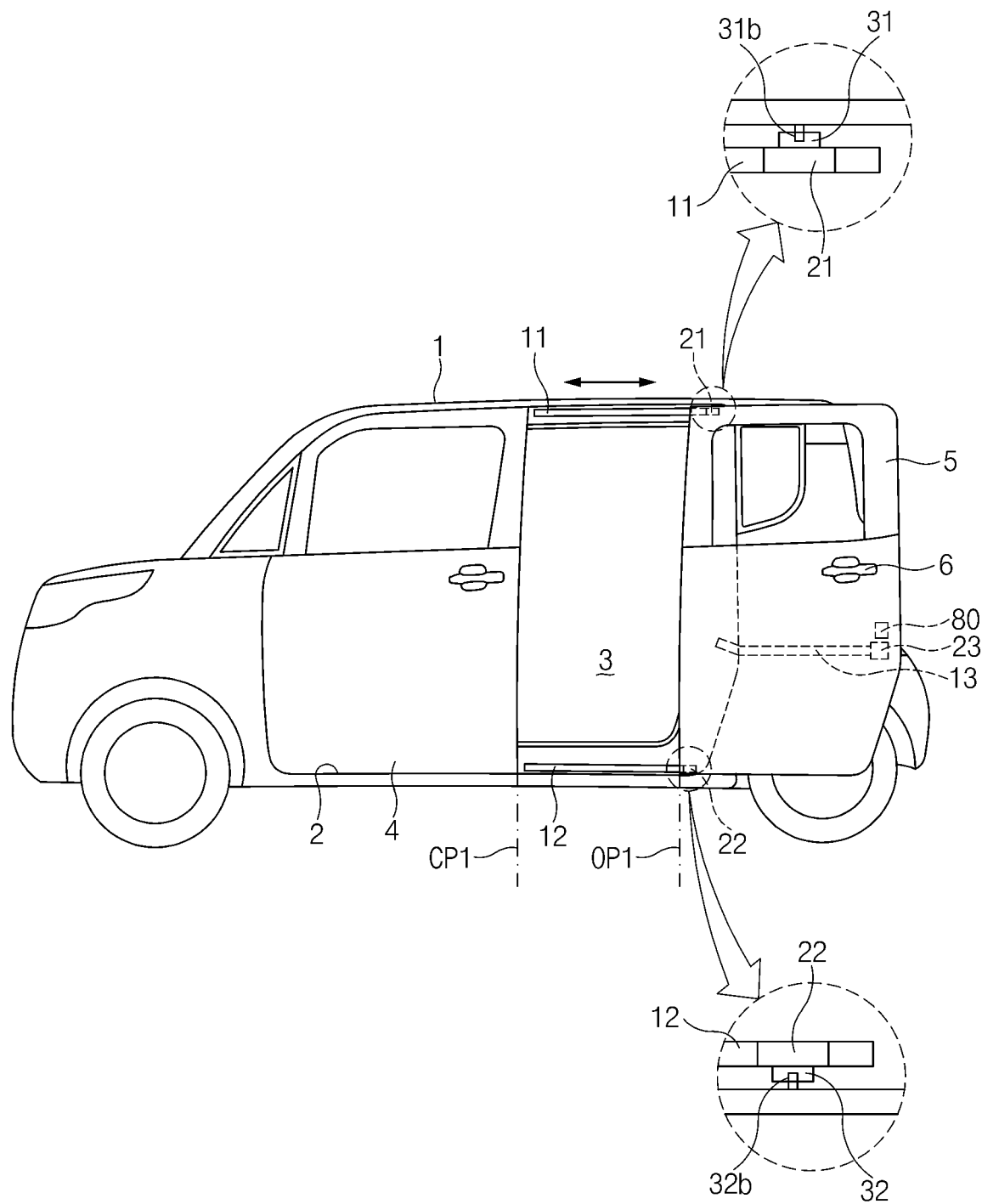
FIG. 3 illustrates a state in which the door of FIG. 1 is opened in a sliding mode.

Referring to FIGS. 1 and 3, an upper roller unit 21 may be mounted on an upper end of the vehicle door 5, and the upper roller unit 21 may slide along the upper rail 11. A lower roller unit 22 may be mounted on a lower end of the vehicle door 5, and the lower roller unit 22 may slide along the lower rail 12.

Figure 2:
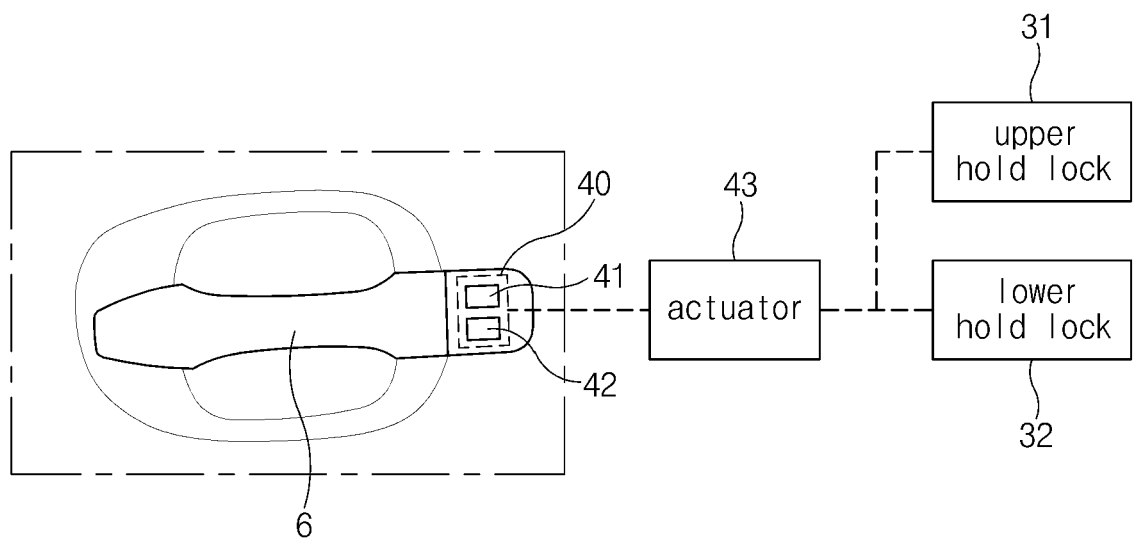
FIG. 2 illustrates a selector adjacent to an outside handle of a vehicle, an actuator connected to the selector, and hold locks.

Referring to FIG. 2, the vehicle door 5 may include an outside handle 6, and a selector 4o for selecting the sliding mode and the swing mode may be disposed on the outside handle 6 or a portion of the vehicle door adjacent to the outside handle 6. The selector 4o may have a first switch 41 selecting the sliding mode, and a second switch 42 selecting the swing mode.

When a user presses the first switch 41 and the sliding mode is selected, the vehicle door 5 may slide along the upper rail 11, the lower rail 12, and a center rail 13 as illustrated in FIG. 3 as the user pushes the outside handle 6 toward the front of the vehicle or pulls the outside handle 6 toward the rear of the vehicle. In the sliding mode, the vehicle door 5 may move between a first open position OP1 in which the vehicle door 5 is fully opened and a first closed position CP1 in which the vehicle door 5 is fully closed, as illustrated in FIGS. 1 and 3.

Figure 4:
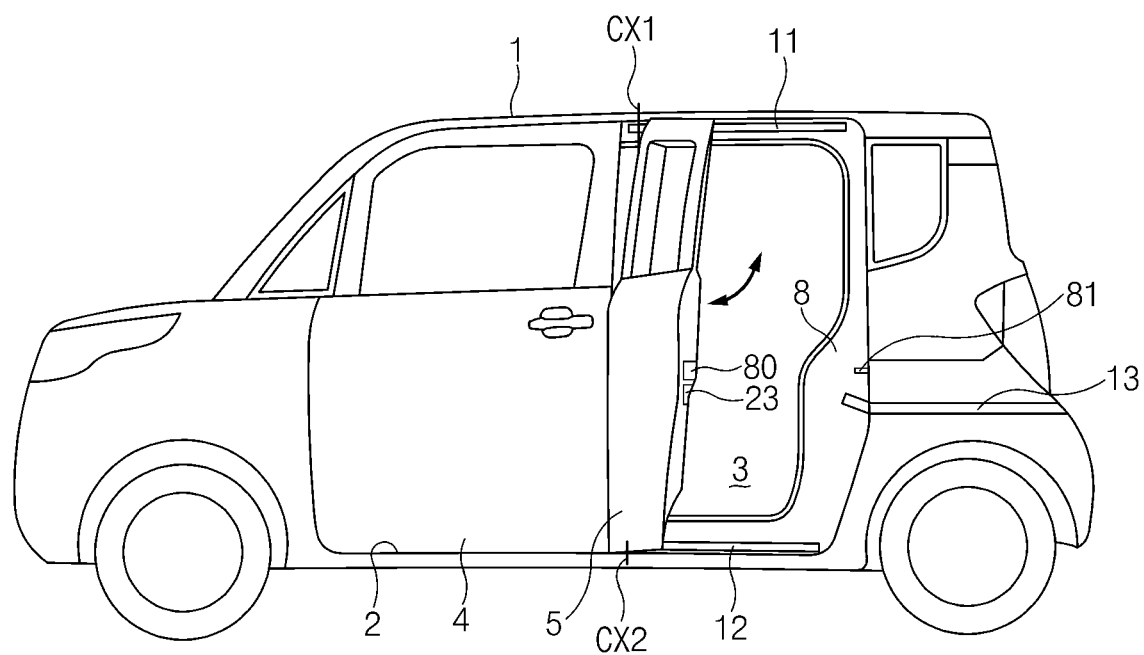
FIG. 4 illustrates a state in which the door of FIG. 1 is opened in a swing mode.
Figure 6:
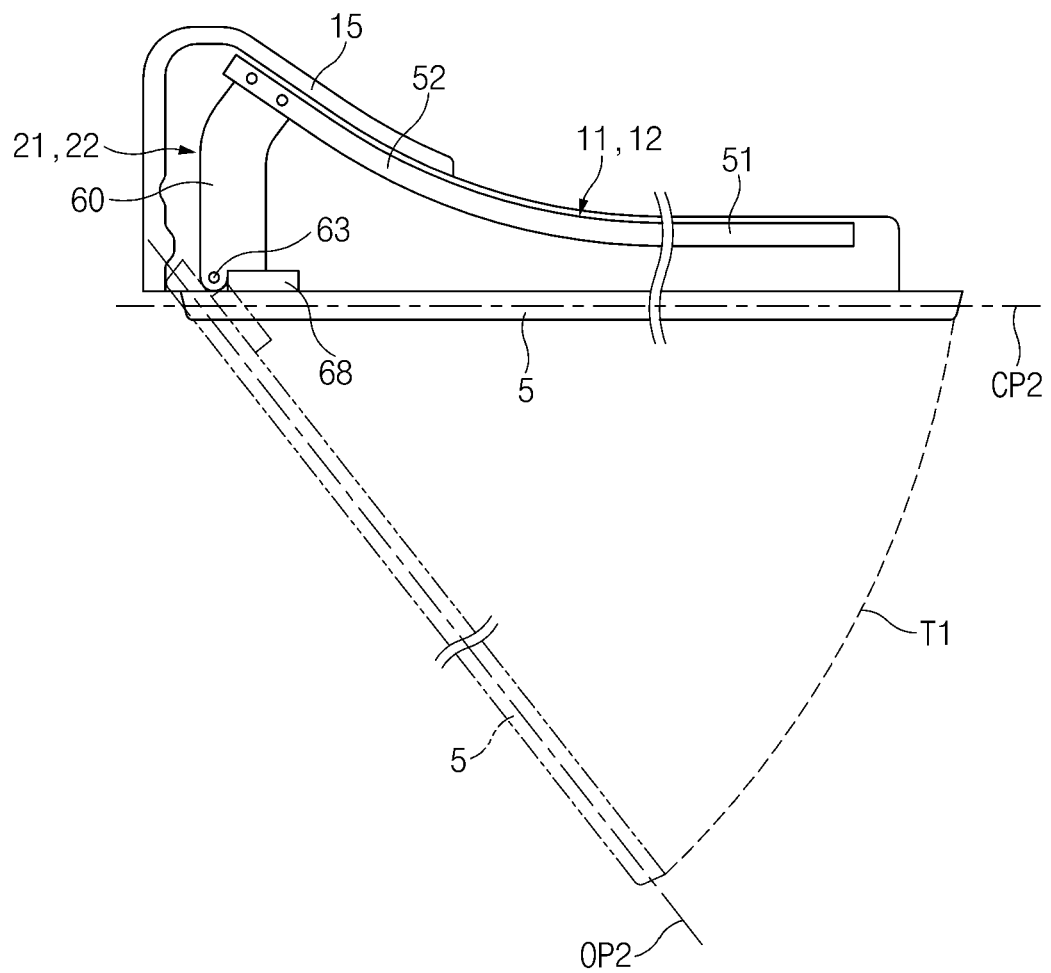
FIG. 6 illustrates a state in which a vehicle door pivots by an upper roller unit and a lower roller unit when the vehicle door is opened and closed in a swing mode in a vehicle door opening and closing apparatus according to an exemplary embodiment of the present disclosure.

When the user presses the second switch 42 and the swing mode is selected, the vehicle door 5 may swing as illustrated in FIG. 4 as the user pushes or pulls the outside handle 6 toward a passenger compartment of the vehicle or toward the exterior of the vehicle. In the swing mode, the vehicle door 5 may move between a second open position OP2 in which the vehicle door 5 is fully opened and a second closed position CP2 in which the vehicle door 5 is fully closed, as illustrated in FIG. 6. In particular, when the vehicle door 5 is held in the first closed position CP1, the swing mode may be operated.

The upper roller unit 21 may have an upper hold lock 31, and the vehicle body 1 may have a first upper striker 31a and a second upper striker 31b protruding downwardly from a top portion of the vehicle body 1. The first upper striker 31a may be aligned with or adjacent to a virtual axis of the first closed position CP1, and the second upper striker 31b may be aligned with or adjacent to a virtual axis of the first open position OP1.

According to an exemplary embodiment, as illustrated in FIGS. 1 and 3, the upper hold lock 31 may releasably hold the first upper striker 31a in the first closed position CP1, and releasably hold the second upper striker 31b in the first open position OP1. That is, one upper hold lock 31 may selectively hold the first upper striker 31a and the second upper striker 31b. As the upper hold lock 31 holds the first upper striker 31a, the upper roller unit 21 may be firmly held in the first closed position CP1 so that the vehicle door 5 may be kept in the first closed position CP1. As the upper hold lock 31 holds the second upper striker 31b, the upper roller unit 21 may be firmly held in the first open position OP1 so that the vehicle door 5 may be kept in the first open position OP1.

According to another exemplary embodiment, the upper hold lock 31 may releasably hold the first upper striker 31a in the first closed position CP1 so that the vehicle door 5 may be kept in the first closed position CP1. That is, the upper hold lock 31 may be an upper closed hold lock which keeps the closed state of the vehicle door 5 in the first closed position CP1. An upper open hold lock (not shown) may be mounted on the upper roller unit 21, and the upper open hold lock may releasably hold the second upper striker 31b in the first open position OP1. That is, the upper closed hold lock, which releasably holds the first upper striker 31a in the first closed position CP1, and the upper open hold lock, which releasably holds the second upper striker 31b in the first open position OP1, may be individually mounted on the upper roller unit 21.

Referring to FIG. 4, the upper roller unit 21 may have an upper rotation axis CX1, and the vehicle door 5 may rotate around the upper rotation axis CX1. When the upper roller unit 21 is firmly held in the first closed position CP1 by the upper hold lock 31 and the first upper striker 31a, the vehicle door 5 may rotate around the upper rotation axis CX1.

The lower roller unit 22 may have a lower hold lock 32, and the vehicle body 1 may have a first lower striker 32a and a second lower striker 32b protruding upwardly from a floor of the vehicle body 1. The first lower striker 32a may be aligned with or adjacent to the virtual axis of the first closed position CP1, and the second lower striker 32b may be aligned with or adjacent to the virtual axis of the first open position OP1.

According to an exemplary embodiment, as illustrated in FIGS. 1 and 3, the lower hold lock 32 may releasably hold the first lower striker 32a in the first closed position CP1, and releasably hold the second lower striker 32b in the first open position OP1. That is, one lower hold lock 32 may selectively hold the first lower striker 32a and the second lower striker 32b. As the lower hold lock 32 holds the first lower striker 32a, the lower roller unit 22 may be firmly held in the first closed position CP1 so that the vehicle door 5 may be kept in the first closed position CP1. As the lower hold lock 32 holds the second lower striker 32b, the lower roller unit 22 may be firmly held in the first open position OP1 so that the vehicle door 5 may be kept in the first open position OP1.

According to another exemplary embodiment, the lower hold lock 32 may releasably hold the first lower striker 32a in the first closed position CP1 so that the vehicle door 5 may be kept in the first closed position CP1. That is, the lower hold lock 32 may be a lower closed hold lock which keeps the closed state of the vehicle door 5 in the first closed position CP1. A lower open hold lock (not shown) may be mounted on the lower roller unit 22, and the lower open hold lock may releasably hold the second lower striker 32b in the first open position OP1. That is, the lower closed hold lock, which releasably holds the first lower striker 32a in the first closed position CP1, and the lower open hold lock, which releasably holds the second lower striker 32b in the first open position OP1, may be individually mounted on the lower roller unit 22.

According to an exemplary embodiment, the vehicle door 5 may be releasably held in the first closed position CP1 by the upper hold lock 31 and the lower hold lock 32 so that the vehicle door 5 may be kept in the first closed position CP1 by the upper hold lock 31 and the lower hold lock 32. That is, the upper hold lock 31 and the lower hold lock 32 may function as the closed hold lock which holds the vehicle door 5 in the first closed position CP1.

Referring to FIG. 4, the lower roller unit 22 may have a lower rotation axis CX2, and the vehicle door 5 may rotate around the lower rotation axis CX2. When the lower roller unit 22 is firmly held in the first closed position CP1 by the lower hold lock 32 and the first lower striker 32a, the vehicle door 5 may rotate around the lower rotation axis CX2.

As illustrated in FIG. 4, the upper rotation axis CX1 and the lower rotation axis CX2 may be vertically aligned, and the vehicle door 5 may rotate around the vertically aligned upper and lower rotation axes CX1 and CX2.

Referring to FIG. 2, the selector 4o may be electrically connected to an actuator 43, and the actuator 43 may be configured to operate the upper hold lock 31 and the lower hold lock 32.

As the user selects the selector 40, the actuator 43 may selectively perform a hold operation in which the upper hold lock 31 holds the first upper striker 31a and the lower hold lock 32 holds the first lower striker 32a, and a release operation in which the upper hold lock 31 releases the first upper striker 31a and the lower hold lock 32 releases the first lower striker 32a.

When the user presses the first switch 41 of the selector 40 in a state in which the vehicle door 5 is closed, the upper hold lock 31 may release the first upper striker 31a and the lower hold lock 32 may release the first lower striker 32a simultaneously by the release operation of the actuator 43. Thus, the user may slide the vehicle door 5 in the longitudinal direction of the vehicle body 1 so that the vehicle door 5 may be opened and closed in the sliding mode.

When the user presses the second switch 42 of the selector 40 in a state in which the vehicle door 5 is closed, the upper hold lock 31 may hold the first upper striker 31a and the lower hold lock 32 may hold the first lower striker 32a simultaneously by the hold operation of the actuator 43, and the upper roller unit 21 and the lower roller unit 22 may be firmly held in the first closed position CP1. Thus, the user may swing the vehicle door 5 toward an interior space and an exterior space of the vehicle so that the vehicle door 5 may be opened and closed in the swing mode.

According to an exemplary embodiment, as illustrated in FIG. 2, one actuator 43 may operate the upper hold lock 31 and the lower hold lock 32 simultaneously.

According to another exemplary embodiment, an upper actuator operating the upper hold lock 31 and a lower actuator operating the lower hold lock 32 may be individually connected to the selector 40.

FIGS. 9A to 9D illustrate the upper hold lock 31 and the lower hold lock 32 according to an exemplary embodiment of the present disclosure. Referring to FIGS. 9A to 9D, each of the upper hold lock 31 and the lower hold lock 32 may include a catch 71, a pawl 72 releasably engaging with the catch 71, and a lever 73 operatively connected to the pawl 72. The lever 73 may be connected to the actuator 43 through a cable 75. As the cable 75 is reversed (pulled) by the actuator 43, the catch 71 may release the strikers 31a and 32a. A portion of the catch 71, the pawl 72, and the lever 73 may be covered by a cover plate 76, and the cover plate 76 may be attached to a mounting plate 74. The strikers 31a and 32a may be fixed to the vehicle body 1 by a mounting plate 78.

Referring to FIGS. 9A to 9D, the upper hold lock 31 may releasably hold the first upper striker 31a, and the lower hold lock 32 may releasably hold the first lower striker 32a.

Figure 9A:
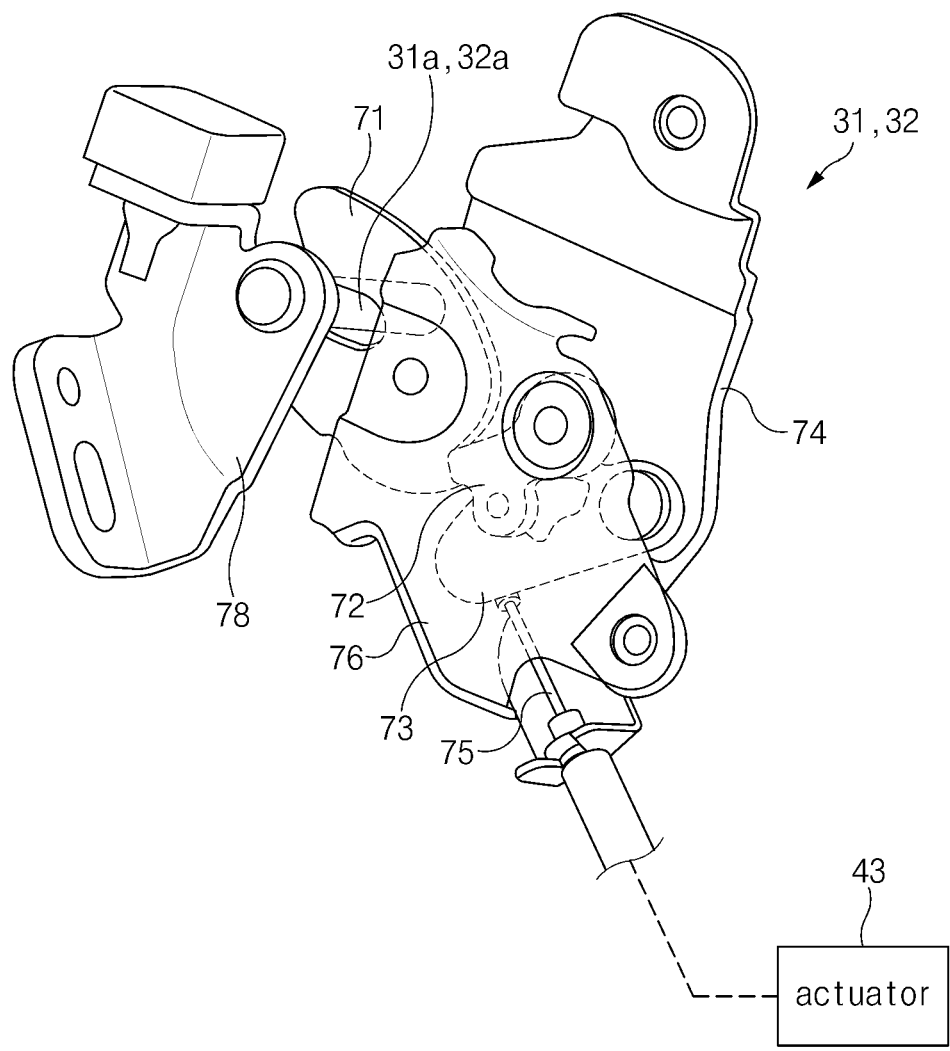
FIG. 9A illustrates a perspective view of an upper hold lock and a lower hold lock.
Figure 9B:
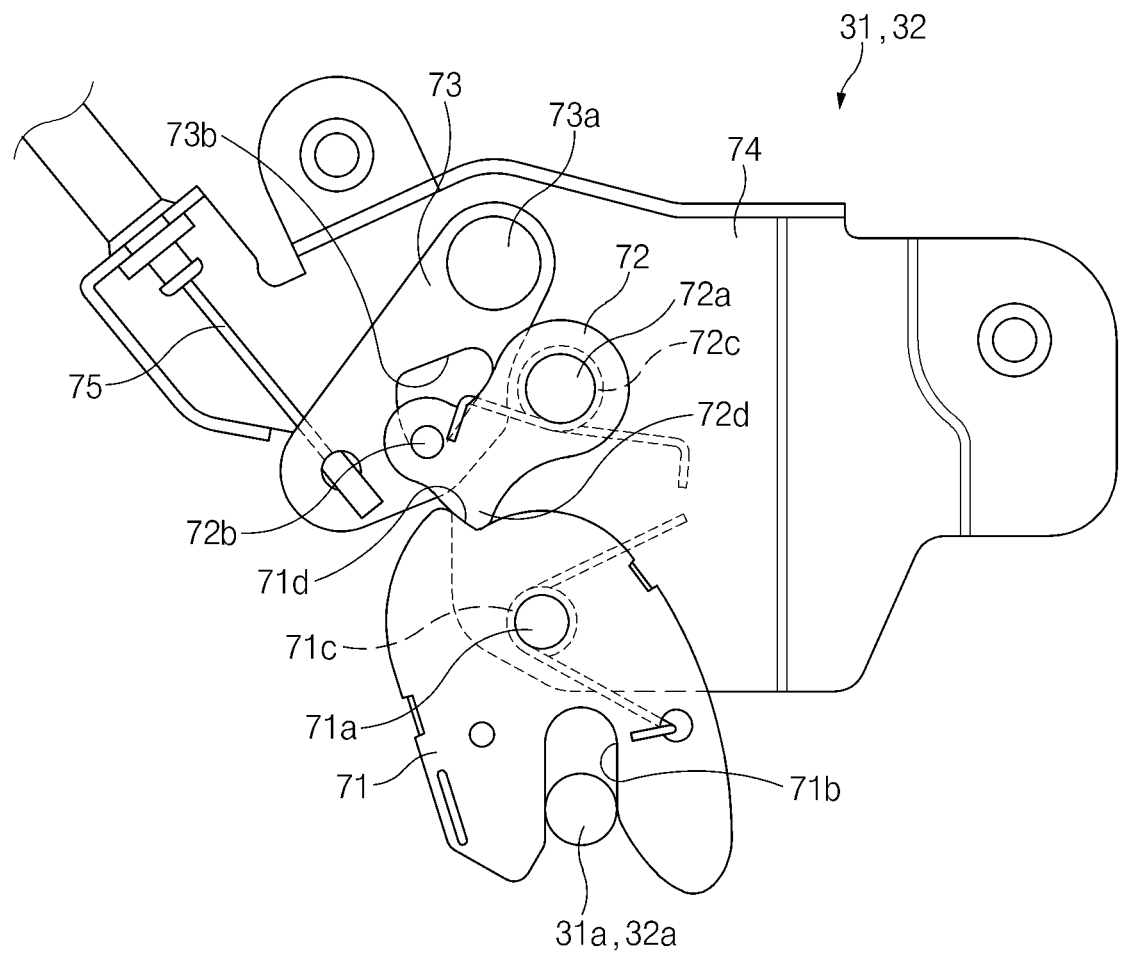
FIG. 9B illustrates a state in which an upper hold lock and a lower hold lock hold corresponding strikers.
Figure 9C:
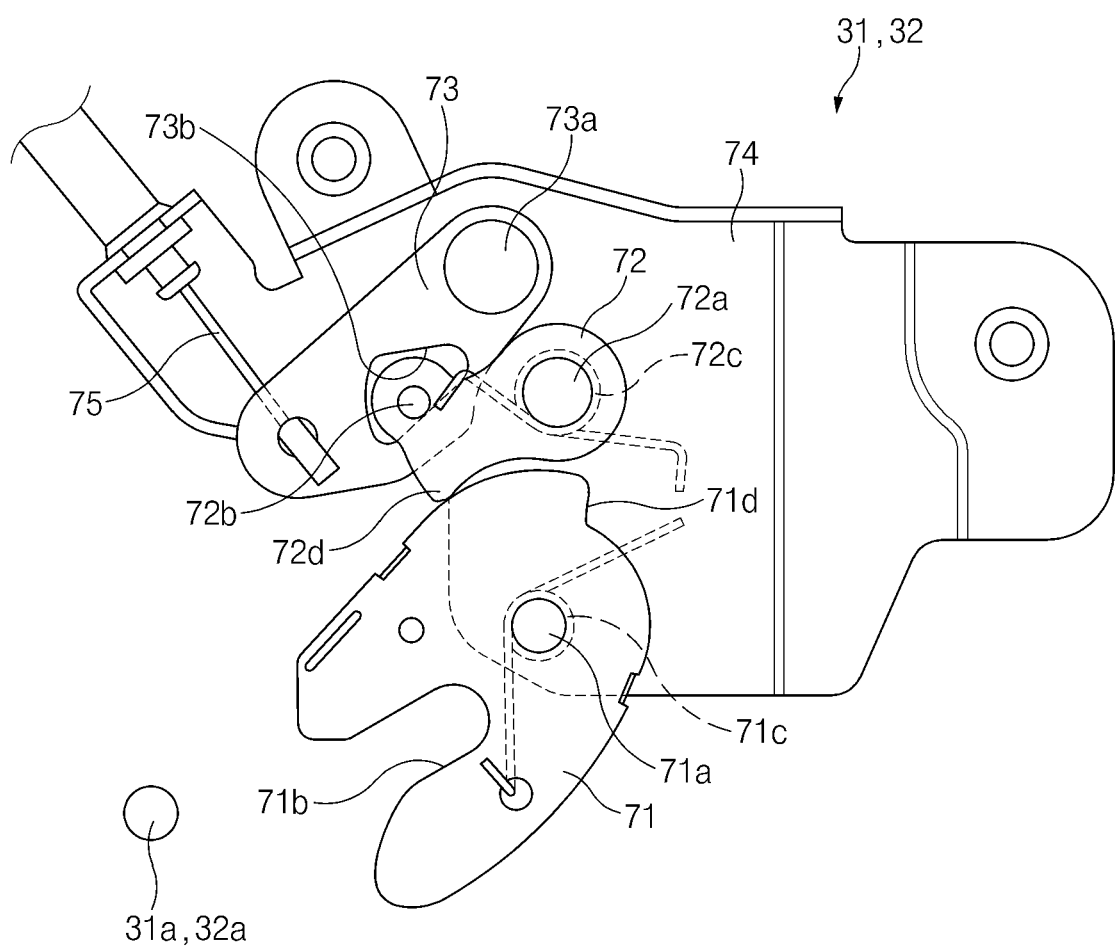
FIG. 9C illustrates a state in which an upper hold lock and a lower hold lock release corresponding strikers.

The catch 71 may be pivotally mounted on the mounting plate 74 through a first pivot shaft via. The catch 71 may have a slot 71b receiving the strikers 31a and 32a, and the catch 71 may engage with or release the strikers 31a and 32a. The catch 71 may move between an engaging position (see FIG. 9B) and a release position (see FIG. 9C). The engaging position refers to a position in which the catch 71 engages with the strikers 31a and 32a as illustrated in FIG. 9B, and the release position refers to a position in which the catch 71 releases the strikers 31a and 32a as illustrated in FIG. 9C. When the catch 71 is in the engaging position as illustrated in FIG. 9B, the catch 71 may engage with the strikers 31a and 32a so that the catch 71 may hold the strikers 31a and 32a. When the catch 71 is in the release position as illustrated in FIG. 9C, the catch 71 may release the strikers 31a and 32a. Thus, the strikers 31a and 32a may be released from the slot 71b of the catch 71 or be received in the slot 71b of the catch 71. The catch 71 may be biased toward the release position by a first biasing element 71c such as a torsion spring. The first biasing element 71c may be disposed around the first pivot shaft via. The catch 71 may have a locking shoulder 71d.

Figure 9D:
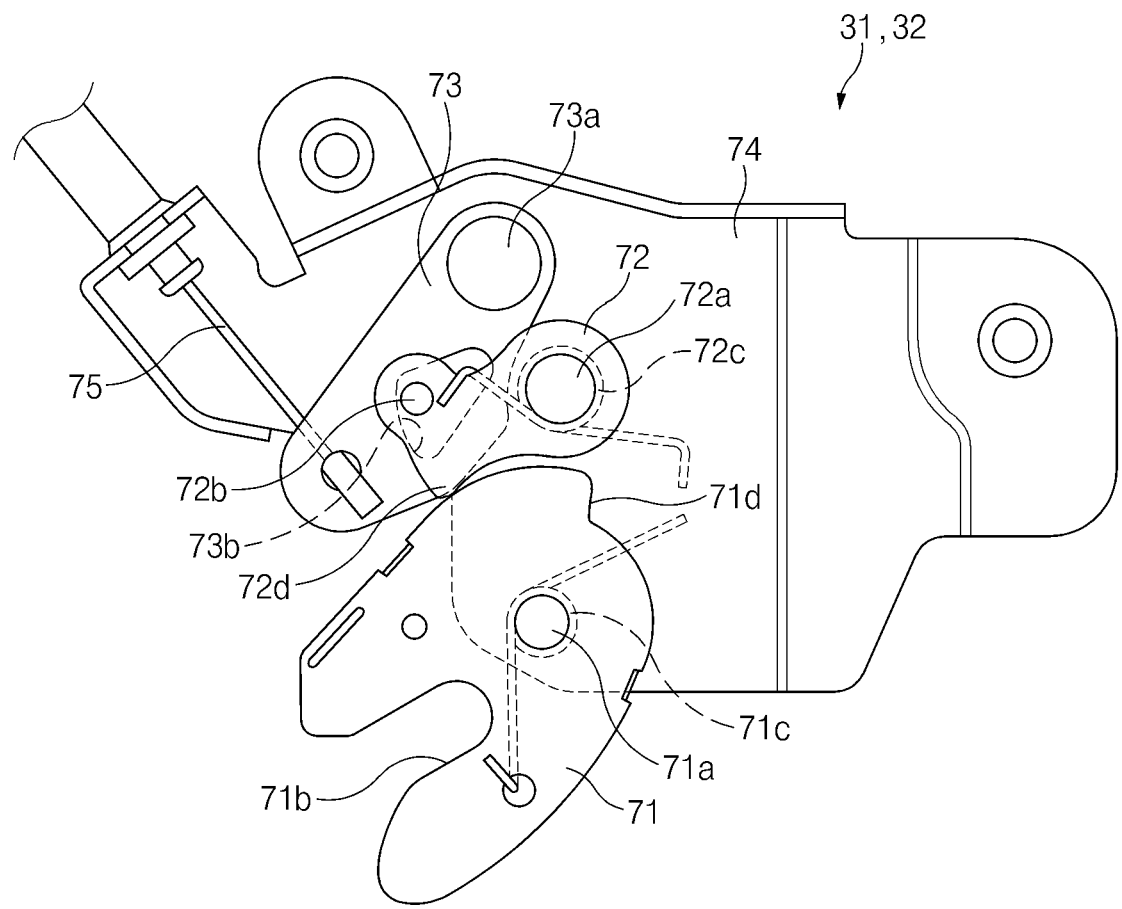
FIG. 9D illustrates a state in which an upper hold lock and a lower hold lock are allowed to receive corresponding strikers.

The pawl 72 may be pivotally mounted on the mounting plate 74 through a second pivot shaft 72a, and the pawl 72 may move between a pawl locking position (see FIG. 9B) and a pawl release position (see FIGS. 9C and 9D). The pawl locking position refers to a position in which the pawl 72 engages with the catch 71 and the catch 71 is kept in the engaging position, and the pawl release position refers to a position in which the pawl 72 releases the catch 71 and the catch 71 is allowed to move from the engaging position to the release position. As illustrated in FIG. 9B, when the pawl 72 is in the pawl locking position, the movement (rotation) of the catch 71 may be restricted by the pawl 72 so that the catch 71 may be kept in the engaging position. As illustrated in FIGS. 9C and 9D, when the pawl 72 is in the pawl release position, the movement (rotation) of the catch 71 may not be restricted by the pawl 72 so that the catch 71 may move from the engaging position to the release position. The pawl 72 may be biased toward the pawl locking position (see FIG. 9B) by a second biasing element 72c such as a torsion spring. The second biasing element 72c may be disposed around the second pivot shaft 72a.

The pawl 72 may have a locking projection 72d engageable with the locking shoulder 71d of the catch 71. As illustrated in FIG. 9B, as the pawl 72 is moved to the pawl locking position by the second biasing element 72c, the locking projection 72d of the pawl 72 may engage with the locking shoulder 71d of the catch 71 so that the movement (rotation) of the catch 71 may be restricted, and accordingly the catch 71 may be kept in the engaging position. As illustrated in FIG. 9C, as the pawl 72 is moved to the pawl release position by the lever 73, the locking projection 72d of the pawl 72 may be released from the locking shoulder 71d of the catch 71 so that the movement (rotation) of the catch 71 may be allowed, and accordingly the catch 71 may be moved to the release position by the first biasing element 71c.

The lever 73 may be pivotally mounted on the mounting plate 74 through a third pivot shaft 73a. The lever 73 may be connected to the actuator 43 through the cable 75. An end of the cable 75 may be fixed to the lever 73, and the cable 75 may be advanced or reversed by the actuator 43. As the actuator 43 moves the cable 75, the lever 73 may pivot around the third pivot shaft 73a. As the cable 75 is reversed, the lever 73 may move the pawl 72 to the pawl release position (see FIG. 9C).

The lever 73 may be operatively connected to the pawl 72 through a pin 72b and an opening 73b. The pin 72b may be provided on the pawl 72, and the opening 73b may be provided in the lever 73. The pin 72b may be movably received in the opening 73b. As the lever 73 pivots around the third pivot shaft 73a, the pin 72b may move in the opening 73b, allowing the pawl 72 to move.

As illustrated in FIG. 9B, when the cable 75 is advanced by the actuator 43, the locking projection 72d of the pawl 72 may engage with the locking shoulder 71d of the catch 71 so that the movement (rotation) of the catch 71 may be restricted. Accordingly, the catch 71 may be kept in the engaging position, and the strikers 31a and 32a may be held in the slot 71b of the catch 71. That is, the upper hold lock 31 and the lower hold lock 32 may hold the corresponding strikers 31a and 32a.

As illustrated in FIG. 9C, when the cable 75 is reversed by the actuator 43, the lever 73 may move the pawl 72 to the pawl release position. The locking projection 72d of the pawl 72 may be released from the locking shoulder 71d of the catch 71 so that the movement (rotation) of the catch 71 may be allowed. Accordingly, the catch 71 may be moved to the release position by the first biasing element 71c, and the strikers 31a and 32a may be released from the slot 71b of the catch 71. Thus, the upper hold lock 31 and the lower hold lock 32 may release the corresponding strikers 31a and 32a, and the upper roller unit 21 and the lower roller unit 22 may slide along the upper rail 11 and the lower rail 12.

As illustrated in FIG. 9D, even when the cable 75 is advanced by the actuator 43 in a state in which the locking projection 72d of the pawl 72 is released from the locking shoulder 71d of the catch 71, the catch 71 may be kept in the release position by the first biasing element 71c so that the movement (rotation) of the catch 71 may be allowable. In this state, the strikers 31a and 32a may be allowed to be received in the slot 71b of the catch 71. That is, in a state in which the movement (rotation) of the catch 71 is allowable as the locking projection 72d of the pawl 72 is released from the locking shoulder 71d of the catch 71, when the upper roller unit 21 and the lower roller unit 22 slide between the first closed position CP1 and the first open position OP1, the strikers 31a and 32a may be allowed to be received in the slot 71b of the catch 71. When a force applied through the upper hold lock 31 and the lower hold lock 32 in a state in which the strikers 31a and 32a are received in the slot 71b of the catch 71 is greater than a spring force of the first biasing element 71c, the catch 71 may be moved to the engaging position. As illustrated in FIG. 9B, as the locking projection 72d of the pawl 72 engages with the locking shoulder 71d of the catch 71, the catch 71 may hold the strikers 31a and 32a.

Figure 5:
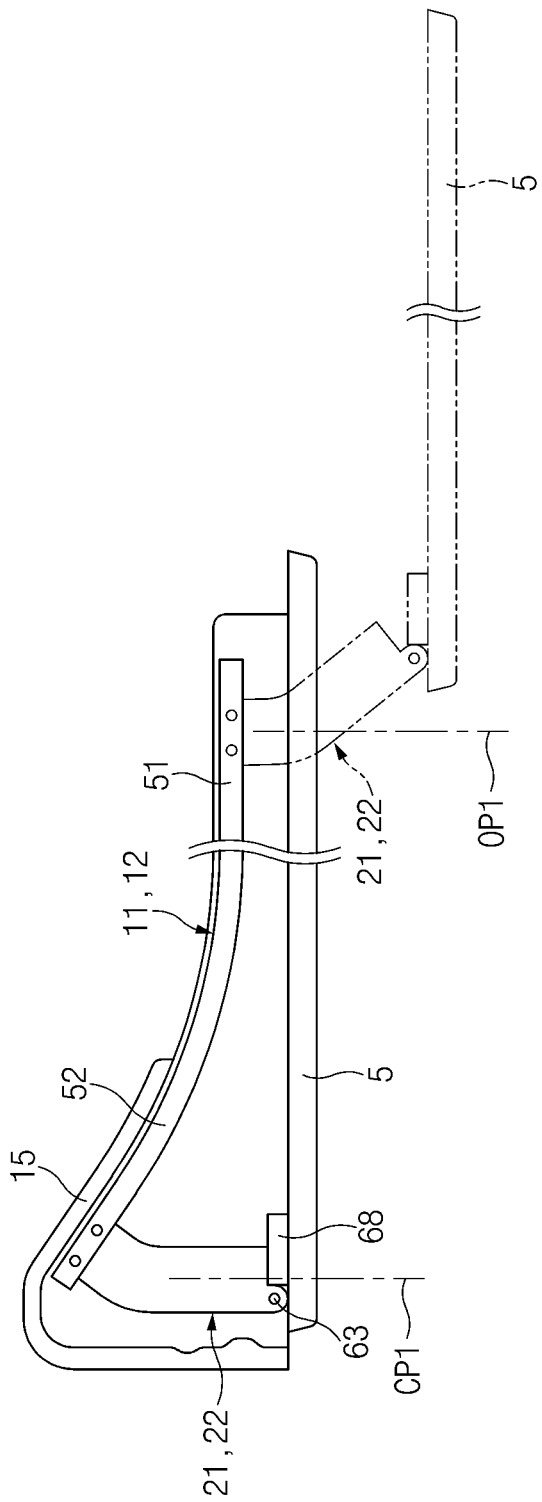
FIG. 5 illustrates a state in which an upper roller unit and a lower roller unit move along an upper rail and a lower rail when a vehicle door is opened and closed in a sliding mode in a vehicle door opening and closing apparatus according to an exemplary embodiment of the present disclosure.

Referring to FIG. 5, each of the upper rail 11 and the lower rail 12 may be mounted on the vehicle body 1 through a mounting bracket 15, and the mounting bracket 15 may have a shape corresponding to that of the upper rail 11 and the lower rail 12. Each of the upper rail 11 and the lower rail 12 may have a first extension portion 51 extending straightly in the longitudinal direction of the vehicle, and a second extension portion 52 extending from the first extension portion 51 toward the interior space of the vehicle. The second extension portion 52 may be bent with respect to the first extension portion 51 at a predetermined angle.

Figure 7:
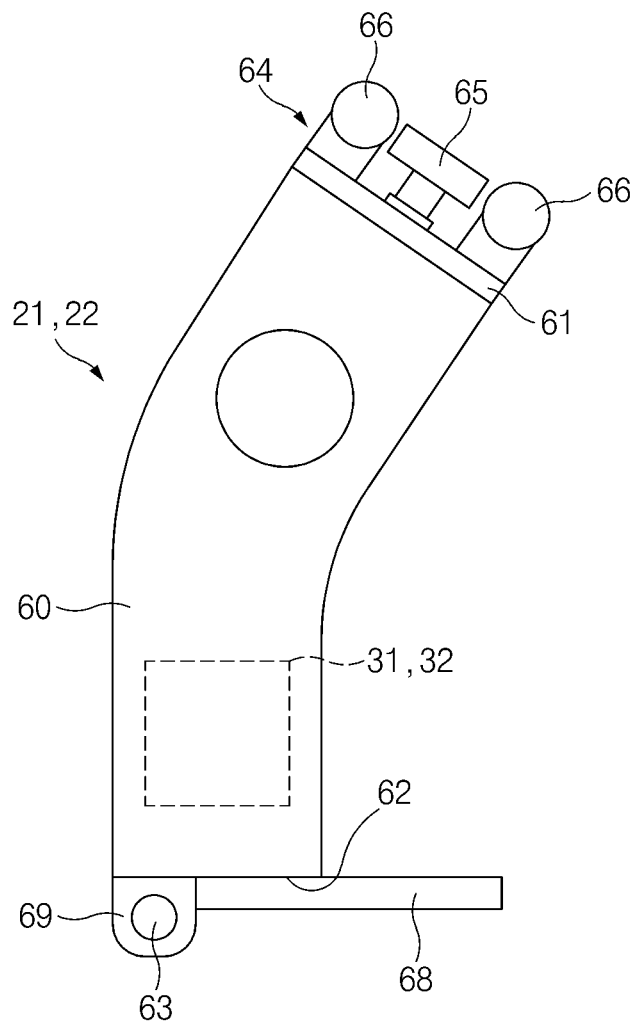
FIG. 7 illustrates an upper roller unit and a lower roller unit in a vehicle door opening and closing apparatus according to an exemplary embodiment of the present disclosure.
Figure 8:
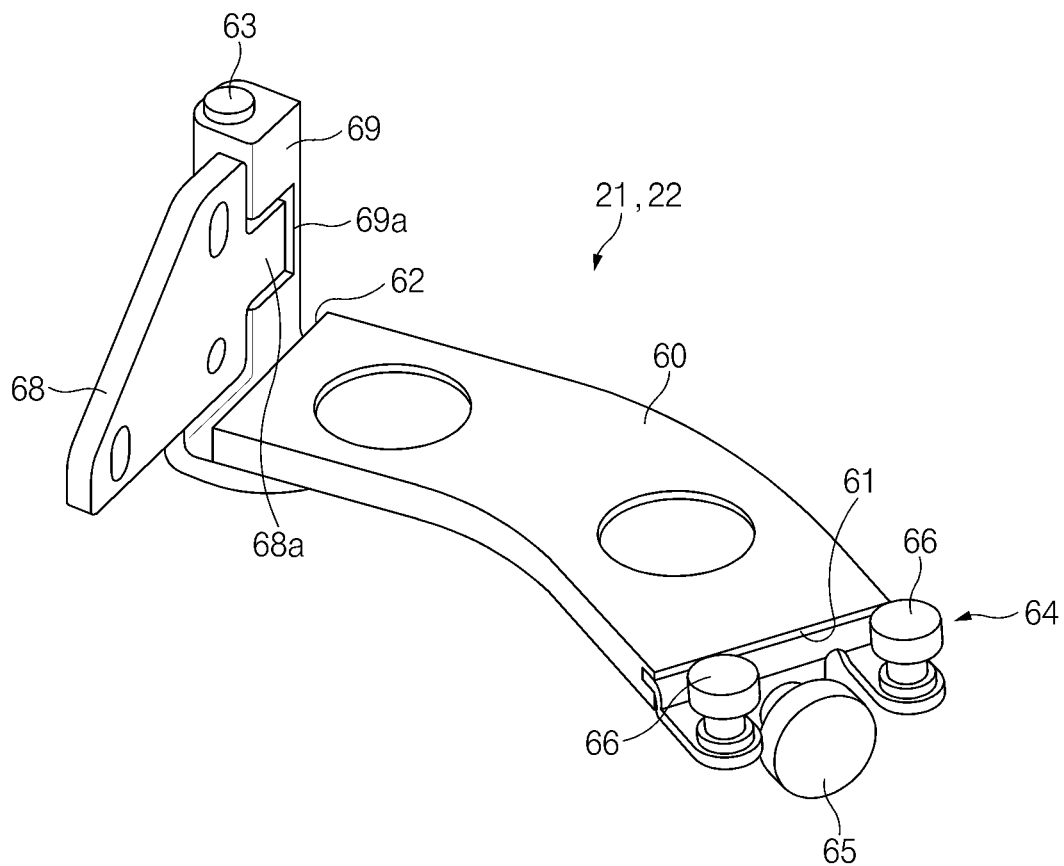
FIG. 8 illustrates a perspective view of an upper roller unit and a lower roller unit in a vehicle door opening and closing apparatus according to an exemplary embodiment of the present disclosure.

Referring to FIGS. 7 and 8, each of the upper roller unit 21 and the lower roller unit 22 may include a roller bracket 64 having rollers 65 and 66 rolling along the rails 11 and 12, and a body 60 connecting the roller bracket 64 and the vehicle door 5.

The roller bracket 64 may rotatably support the rollers 65 and 66, and the rollers 65 and 66 may roll along the upper rail 11 and the lower rail 12. As illustrated in FIG. 8, a middle roller 65 and two side rollers 66 disposed on both sides with respect to the middle roller 65 may be rotatably mounted on the roller bracket 64. A rotation axis of the middle roller 65 may be perpendicular to a rotation axis of the side roller 66.

The body 60 may be curved so as not to interfere with the first extension portion 51 and the second extension portion 52. The body 60 may have a first end portion 61 facing the interior of the vehicle, and a second end portion 62 facing the exterior of the vehicle. The first end portion 61 of the body 60 may be fixed to the roller bracket 64 using fasteners, welding, and/or the like, and the second end portion 62 of the body 60 may be pivotally connected to the vehicle door 5 through a pivot pin 63. The vehicle door 5 may swing around the pivot pin 63 adjacent to the second end portion 62 of the body 60.

Referring to FIGS. 7 and 8, the roller bracket 64 may be directly fixed to the first end portion 61 of the body 60 using fasteners, welding, and/or the like, and the second end portion 62 of the body 60 may be pivotally connected to the vehicle door 5 through the pivot pin 63. A first pivot bracket 68 may be fixed to the vehicle door 5 using fasteners, welding, and/or the like, and a second pivot bracket 69 may be fixed to the second end portion 62 of the body 60 using fasteners, welding, and/or the like. The first pivot bracket 68 may have a lug 68a, and the second pivot bracket 69 may have a recess 69a. The lug 68a of the first pivot bracket 68 may be fitted into the recess 69a of the second pivot bracket 69, and the pivot pin 63 may extend through the lug 68a of the first pivot bracket 68 and the second pivot bracket 69. The upper rotation axis CX1 and the lower rotation axis CX2 may be defined by the pivot pin 63. For example, the upper rotation axis CX1 and the lower rotation axis CX2 may be a virtual axis extending vertically along a center point of the pivot pin 63, and the upper rotation axis CX1 and the lower rotation axis CX2 may be vertically aligned, and accordingly the vehicle door 5 may swing around the vertical rotation axis that virtually connects the upper rotation axis CX1 and the lower rotation axis CX2. The upper hold lock 31 may be fixed to the body 60 of the upper roller unit 21, and the lower hold lock 32 may be fixed to the body 60 of the lower roller unit 22.

When the upper hold lock 31 firmly holds the body 60 of the upper roller unit 21 in the first closed position CP1 and the lower hold lock 32 firmly holds the body 60 of the lower roller unit 22 in the first closed position CP1, the vehicle door 5 may swing around the upper rotation axis CX1 of the upper roller unit 21 and the lower rotation axis CX2 of the lower roller unit 22. Accordingly, the vehicle door 5 may move between the second closed position CP2 in which the vehicle door 5 is closed and the second open position OP2 in which the vehicle door 5 is opened.

The vehicle door opening and closing apparatus, according to exemplary embodiments of the present disclosure, may further include the center rail 13 mounted on a central portion of the vehicle, and a center roller unit 23 guided along the center rail 13.

Referring to FIG. 4, a main latch 80 may be mounted on a rear edge of the vehicle door 5, and a main striker 81 may be mounted on a peripheral face of the vehicle body 1 adjacent to a door frame area 8 of the vehicle body 1. The door frame area 8 refers to a frame area of the vehicle body 1 defining the door opening 3. The main latch 80 may be located adjacent to the center roller unit 23, and the main striker 81 may be located adjacent to a front portion of the center rail 13.

Figure 10:
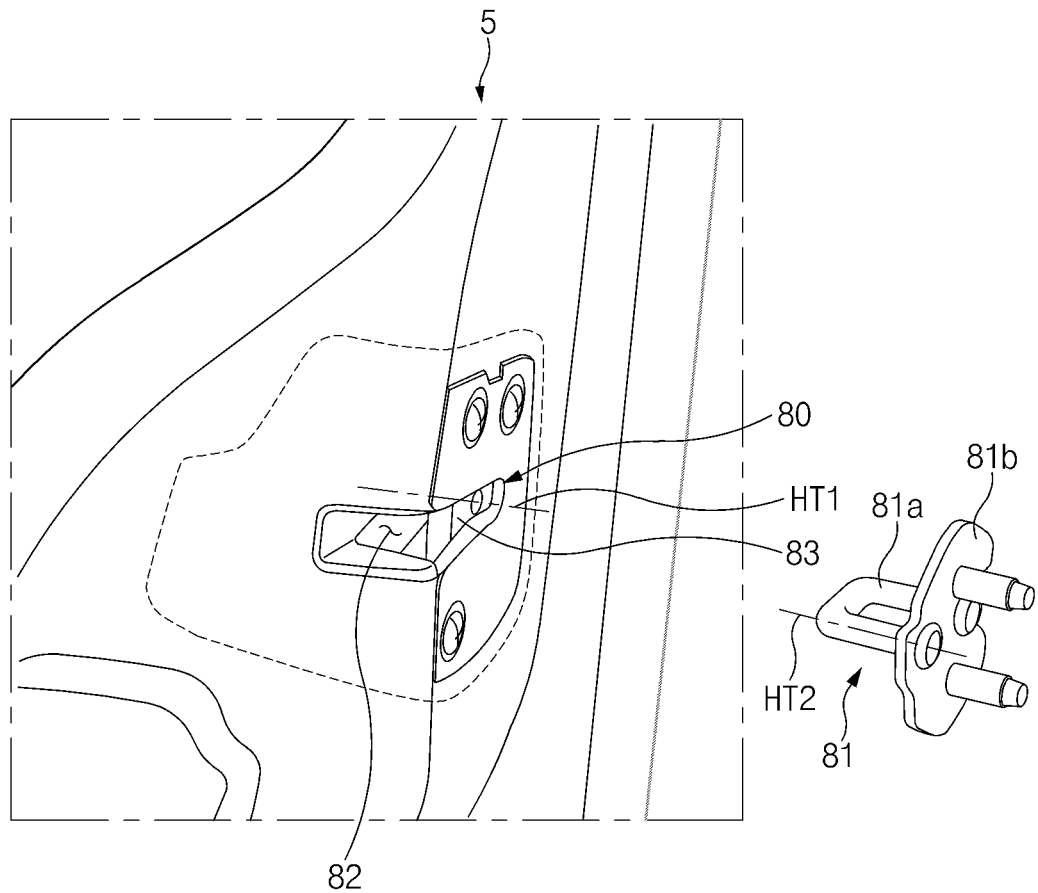
FIG. 10 illustrates a main latch mounted on a vehicle door and a main striker.

Referring to FIG. 10, the main latch 80 may be mounted on the rear edge of the vehicle door 5, and the main latch 80 may include a catch 83 rotatable around a rotation axis HT1 extending in the longitudinal direction of the vehicle. The main striker 81 may include a U-shaped rod 81a, and a base 81b fixed to the vehicle body 1. A slot 82 may be formed in the rear edge of the vehicle door 5, and the U-shaped rod 81a may be received in the slot 82 when the vehicle door 5 is closed. The U-shaped rod 81a may have a longitudinal axis HT2 extending in the longitudinal direction of the vehicle. The rotation axis HT1 of the catch 83 may be parallel to the longitudinal axis HT2 of the U-shaped rod 81a. In particular, the rotation axis HT1 of the catch 83 and the longitudinal axis HT2 of the U-shaped rod 81a may extend horizontally. The catch 83 of the main latch 80 may releasably engage with the rod 81a of the main striker 81. When the vehicle door 5 is in the first closed position CP1 or the second closed position CP2, the catch 83 of the main latch 80 may engage with the rod 81a of the main striker 81 by an engaging operation of the outside handle 6 so that the vehicle door 5 may be locked in the first closed position CP1 or the second closed position CP2. When the vehicle door 5 is in the first closed position CP1 or the second closed position CP2, the catch 83 of the main latch 80 may release the rod 81a of the main striker 81 by a release operation of the outside handle 6 so that the vehicle door 5 may be allowed to move in the sliding mode or the swing mode. When the vehicle door 5 is held in the first closed position CP1 and the catch 83 of the main latch 80 releases the rod 81a of the main striker 81, the center roller unit 23 may be released from the center rail 13, and thus the vehicle door 5 may be opened and closed in the swing mode.

Referring to FIGS. 1 and 3, the center rail 13 may extend along a center line of the vehicle body 1, and the center rail 13 may extend from a rear edge of the door aperture 3 in the longitudinal direction of the vehicle. The center roller unit 23 may be pivotally mounted on a central portion of the vehicle door 5. In particular, the center roller unit 23 may be mounted adjacent to a rear end of the vehicle door 5. The center roller unit 23 may be guided along the center rail 13.

Figure 11:
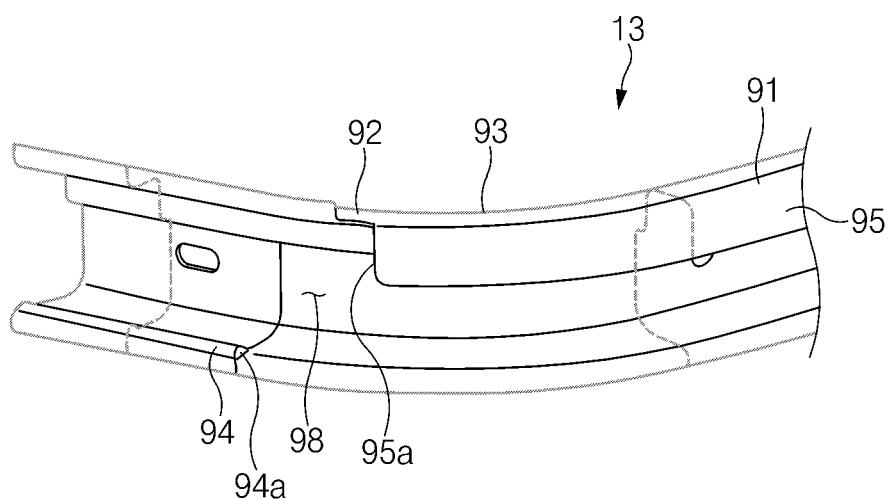
FIG. 11 illustrates a perspective view of a center rail in a vehicle door opening and closing apparatus according to an exemplary embodiment of the present disclosure.

Referring to FIG. 11, the center rail 13 may include a sliding guide 91 extending straightly in the longitudinal direction of the vehicle, and a swing guide 92 extending from the sliding guide 91 toward the interior of the vehicle. The swing guide 92 may be bent at a predetermined angle with respect to the sliding guide 91 through a bending portion 93, and the bending portion 93 may be curved at a predetermined radius.

Figure 12:
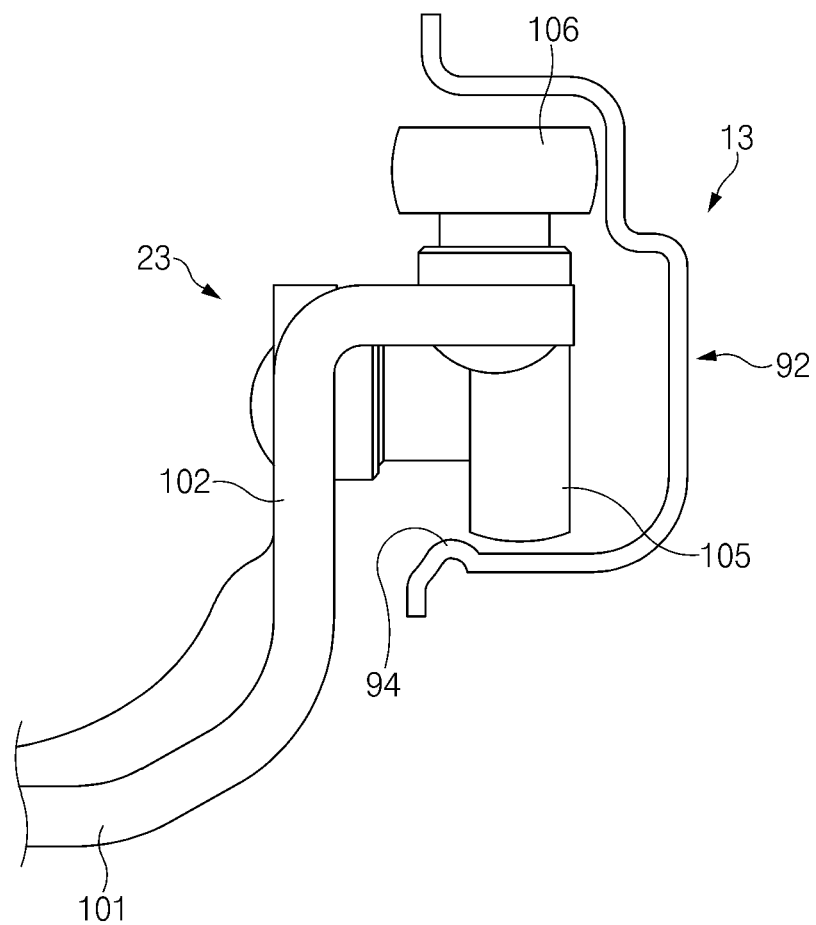
FIG. 12 illustrates a cross-sectional view of a swing guide of a center rail.
Figure 13:
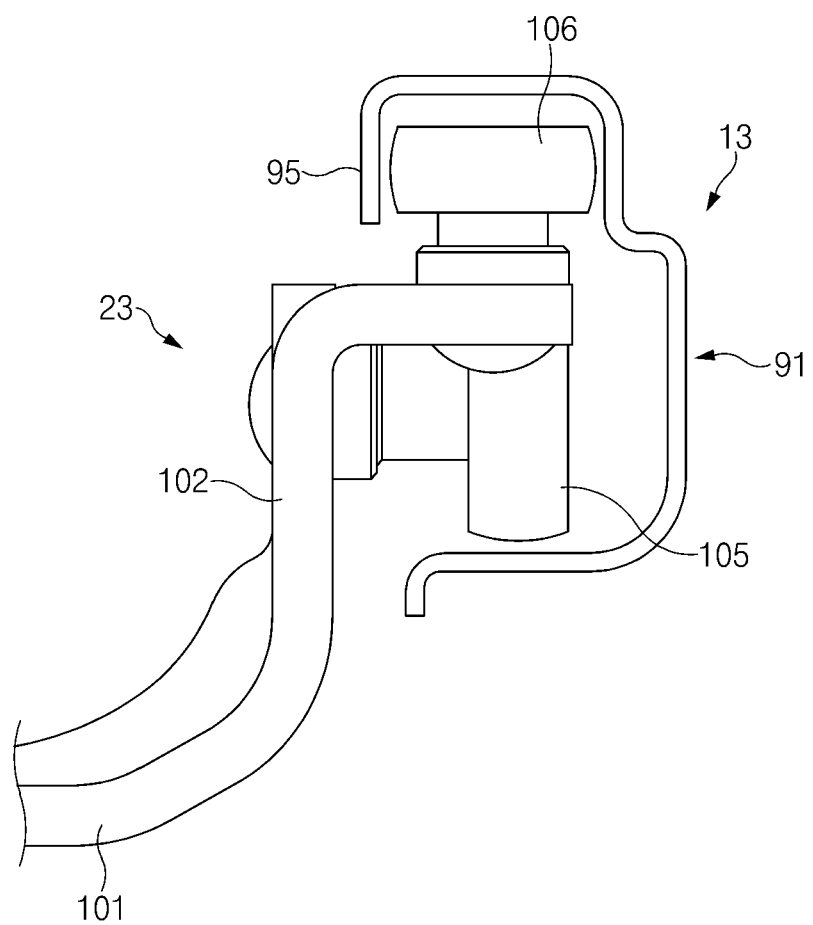
FIG. 13 illustrates a cross-sectional view of a sliding guide of a center rail.
Figure 14:
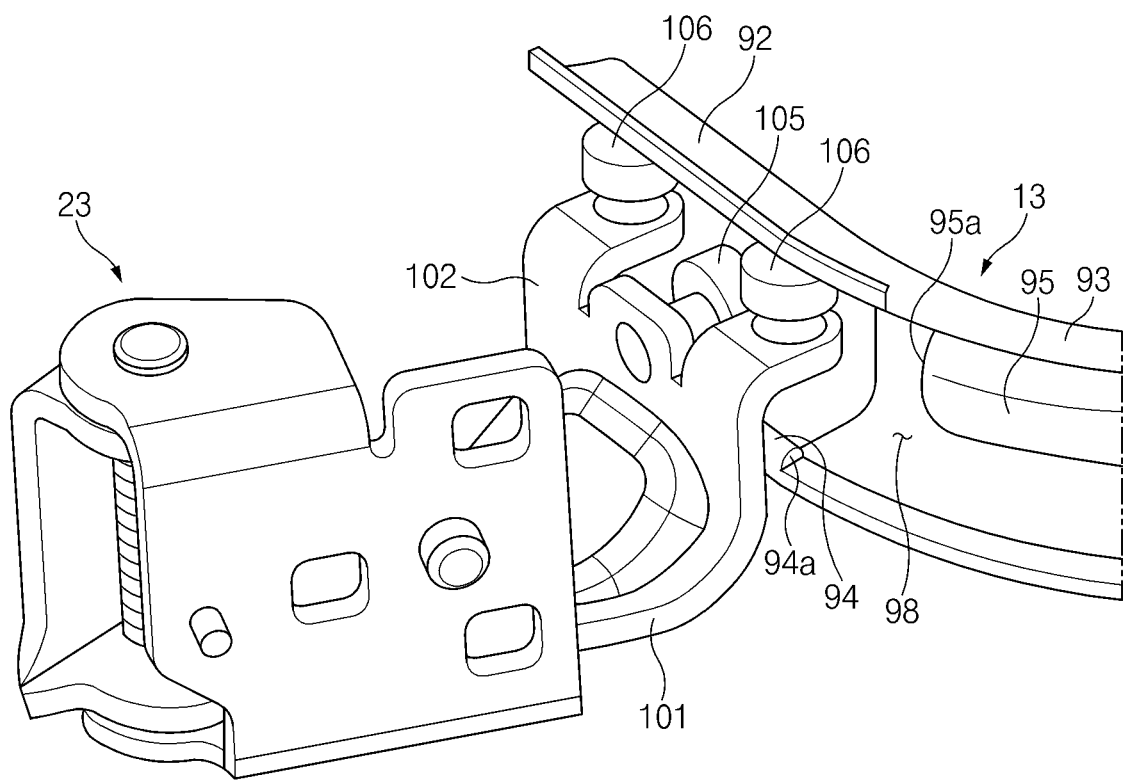
FIG. 14 illustrates a perspective view of a structure in which a center roller unit is held in a swing guide of a center rail.

Referring to FIGS. 12 to 14, the center roller unit 23 may include a roller bracket 101 and rollers 105 and 106 rotatably mounted on the roller bracket 101. The roller bracket 101 may include a first end portion adjacent to the center rail 13, and a second end portion relatively far from the center rail 13. The roller bracket 101 may be pivotally mounted on the central portion of the vehicle door 5, and the roller bracket 101 may include a roller arm 102 bent toward the center rail 13. The roller arm 102 may be bent from the first end portion of the roller bracket 101 at a predetermined angle. Specifically, the roller arm 102 may be perpendicular to the roller bracket 101. The plurality of rollers 105 and 106 may be rotatably mounted on the roller arm 102, and the plurality of rollers 105 and 106 may roll along the center rail 13. As illustrated in FIG. 14, a middle roller 105 and two side rollers 106 disposed on both sides of the middle roller 105 may be rotatably mounted on the roller arm 102 of the roller bracket 101. A rotation axis of the middle roller 105 may be perpendicular to a rotation axis of the side roller 106. The rollers 105 and 106 of the center roller unit 23 may be located on an upper portion of the center rail 13.

When the sliding mode is selected and the vehicle door 5 slides in the longitudinal direction of the vehicle, the sliding guide 91 may guide the rollers 105 and 106 of the center roller unit 23.

Referring to FIGS. 11 and 13, the sliding guide 91 may include a stopper wall 95 preventing the rollers 105 and 106 of the center roller unit 23 from being separated from the sliding guide 91. The sliding guide 91 may have an opening which is open to the exterior of the vehicle, and the stopper wall 95 may be located on an upper portion of the sliding guide 91. The stopper wall 95 may partially block an upper portion of the opening of the sliding guide 91 so that the sliding guide 91 may be partially opened to the exterior of the vehicle. In particular, the stopper wall 95 may be located to face the rollers 105 and 106 of the center roller unit 23 so that the stopper wall 95 may guide the movement of the rollers 105 and 106. The stopper wall 95 may extend along a length of the sliding guide 91 and a length of the bending portion 93. The stopper wall 95 may protrude vertically downward from an upper end of the sliding guide 91. As the stopper wall 95 closes the upper portion of the sliding guide 91 and an upper portion of the bending portion 93, the center roller unit 23 may be prevented from being separated from the sliding guide 91 as illustrated in FIG. 13.

When the swing mode is selected and the vehicle door 5 is opened and closed in the swing mode, the swing guide 92 may allow the rollers 105 and 106 of the center roller unit 23 to be released from the center rail 13.

The swing guide 92 may have an opening which is entirely open toward the door opening 3 and/or the exterior of the vehicle. A guide projection 94 may protrude upwardly from the bottom of the swing guide 92, and the guide projection 94 may extend along a length of the swing guide 92. When the vehicle door 5 swings from the second closed position CP2 to the second open position OP2 along a swing trajectory T1, the middle roller 105 of the center roller unit 23 may be guided along the guide projection 94 as illustrated in FIG. 12.

Figure 15:
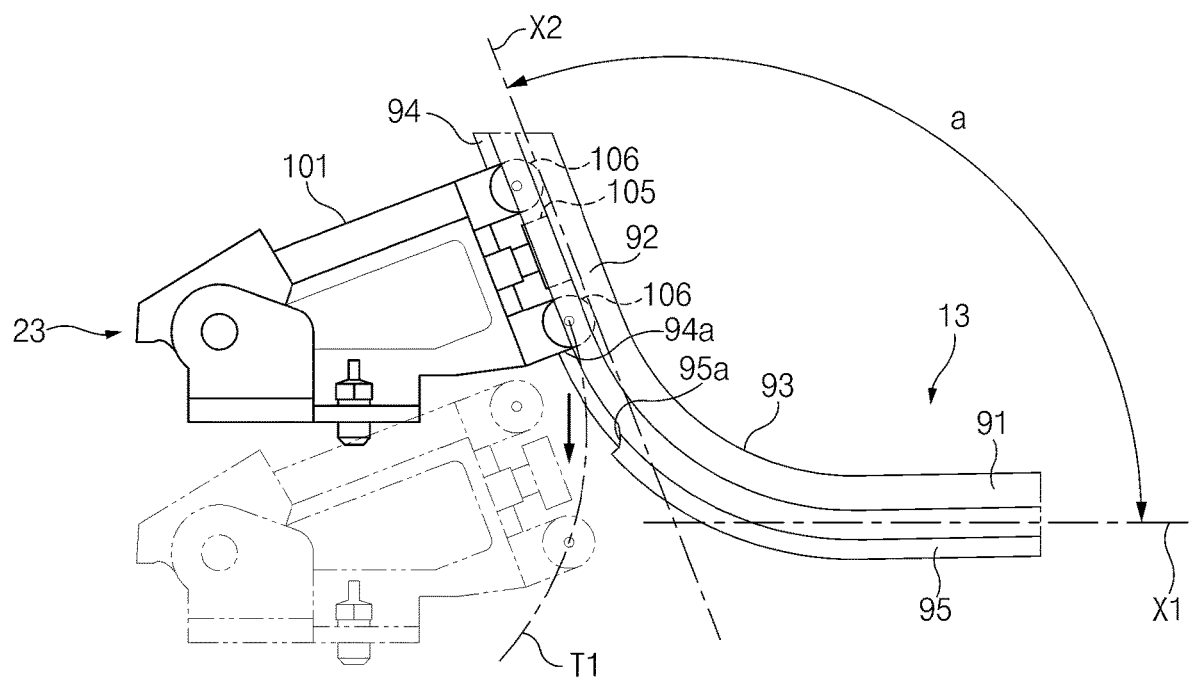
FIG. 15 illustrates a release operation in which a center roller unit is released from a swing guide of a center rail.

A front end 95a of the stopper wall 95 of the sliding guide 91 and a rear end 94a of the guide projection 94 may be located so as not to interfere with the swing trajectory T1 of the vehicle door 5. In addition, as illustrated in FIG. 15, an axis X1 of the sliding guide 91 and an axis X2 of the swing guide 92 may intersect at a predetermined angle a. In particular, the angle a of intersection between the axis X1 of the sliding guide 91 and the axis X2 of the swing guide 92 may be an obtuse angle, so that the rollers 105 and 106 of the center roller unit 23 may easily be released from the swing guide 92 of the center rail 13 or may easily be received in the swing guide 92 of the center rail 13.

The center rail 13 may include a space 98 allowing the rollers 105 and 106 of the center roller unit 23 to be released from the center rail 13 or be received in the center rail 13 when the vehicle door 5 swings in the swing mode. The space 98 may be defined between the front end 95a of the stopper wall 95 and the rear end 94a of the guide projection 94 as the front end 95a of the stopper wall 95 and the rear end 94a of the guide projection 94 are spaced apart from each other. Due to the space 98, there is no interference when the rollers 105 and 106 of the center roller unit 23 are released from the center rail 13 or are received in the center rail 13 in the swing mode.

As illustrated in FIG. 10, the catch 83 of the main latch 8o may rotate around the horizontally extending rotation axis HT1, and the longitudinal axis HT2 of the rod 81a of the main striker 81 may extend horizontally. In this state, the longitudinal axis HT2 of the rod 81a of the main striker 81 may be aligned perpendicular to any one of the swing trajectory T1 or a sliding trajectory T2. Accordingly, the angle and position of the catch 83 of the main latch 80 coming into contact with the rod 81a of the main striker 81 when the vehicle door 5 is closed in the swing mode may be different from those of the catch 83 of the main latch 80 coming into contact with the rod 81a of the main striker 81 when the vehicle door 5 is closed in the sliding mode.

Figure 16:
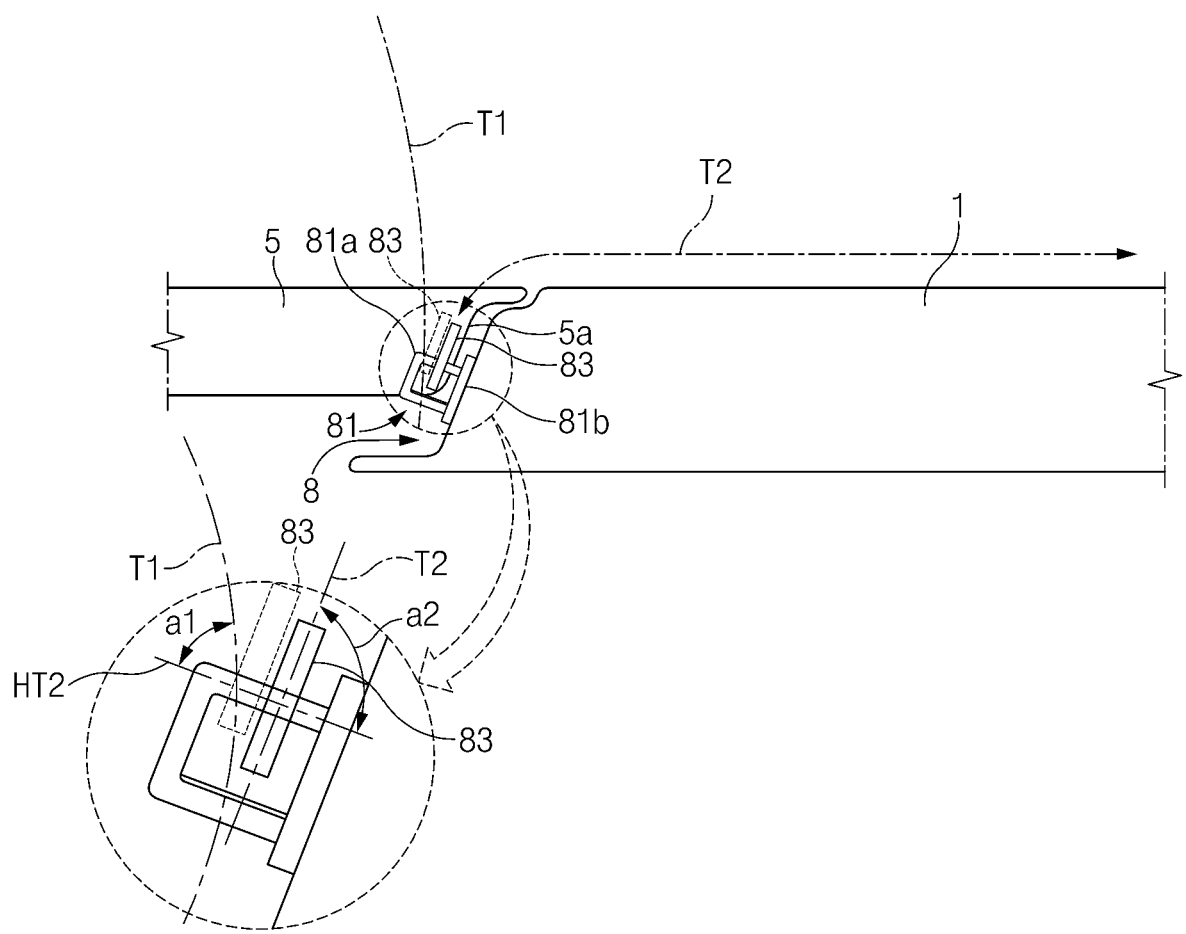
FIG. 16 illustrates a swing trajectory and a sliding trajectory of a vehicle door in a structure of a vehicle door opening and closing apparatus according to an exemplary embodiment of the present disclosure in which a catch of a main latch rotates around a horizontally extending rotation axis, and a longitudinal axis of a rod of a main striker extends horizontally.

Referring to FIG. 16, when the vehicle door 5 is opened and closed in the swing mode, the vehicle door 5 may move along the swing trajectory T1, and when the vehicle door 5 is opened and closed in the sliding mode, the vehicle door 5 may move along the sliding trajectory T2. The longitudinal axis HT2 of the rod 81a of the main striker 81 may be perpendicular to any one of the swing trajectory T1 or the sliding trajectory T2. Since the swing trajectory T1 and the sliding trajectory T2 are different from each other, the angle and position of the catch 83 of the main latch 80 coming into contact with the rod 81a of the main striker 81 when the vehicle door 5 is closed in the swing mode may be different from those of the catch 83 of the main latch 80 coming into contact with the rod 81a of the main striker 81 when the vehicle door 5 is closed in the sliding mode.

Referring to FIG. 16, when the vehicle door 5 is closed along the swing trajectory T1, a contact position between the catch 83 of the main latch 80 and the rod 81a of the main striker 81 may be indicated by a dotted line, and when the vehicle door 5 is closed along the sliding trajectory T2, a contact position between the catch 83 of the main latch 80 and the rod 81a of the main striker 81 may be indicated by a solid line. For example, when the longitudinal axis HT2 of the rod 81a of the main striker 81 is perpendicular to the sliding trajectory T2, an angle a2 of intersection between the catch 83 and the rod 81a may be a right angle, and accordingly good opening/closing quality of the vehicle door 5 in the sliding mode may be normally achieved. In this condition, when the vehicle door 5 is closed in the swing mode, an angle a1 of intersection between the swing trajectory T1 of the catch 83 and the longitudinal axis HT2 of the rod 81a may not be right-angled, and accordingly a load may be applied to the main latch 80 and/or the main striker 81. As a result, the vehicle door 5 may fail to provide good opening/closing quality in the swing mode. When the main striker 81 is aligned perpendicular to any one of the swing trajectory T1 or the sliding trajectory T2, the good opening/closing quality of the vehicle door 5 may be achieved in the aligned trajectory, but may not be achieved in the non-aligned trajectory, which may lead to fine vibrations or slight interference when the vehicle door 5 is opened and closed. When the vehicle door 5 is repeatedly opened and closed over time, fine loads may be accumulated, causing wear, cracks, deformation, and/or the like due to abnormal noise or impacts. As a result, durability may be reduced.

To deal with this problem, the vehicle door opening and closing apparatus, according to exemplary embodiments of the present disclosure, may be designed to allow a catch 181 of a main latch 180 to rotate around an axis VT1 extending in a height direction (that is, vertical direction) of the vehicle, and allow a rod 191 of a main striker 190 to extend in the height direction (that is, vertical direction) of the vehicle so that the catch 181 and the rod 191 may be aligned perpendicular to both the swing trajectory T1 and the sliding trajectory T2. Accordingly, even when the vehicle door 5 is opened and closed in any one mode of the swing mode and the sliding mode, abnormal noise, impacts, vibrations, and the like may not be generated, and a reduction in durability may be prevented.

Figure 18:
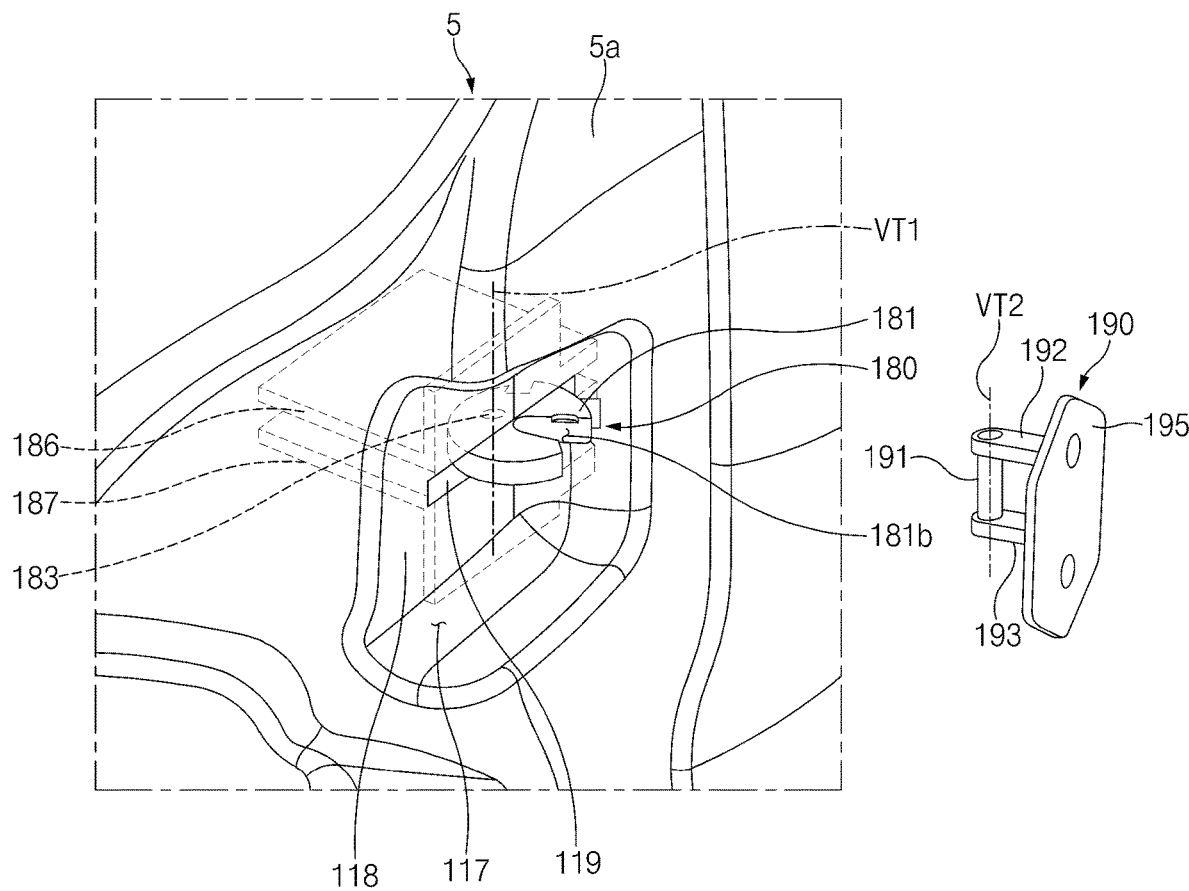
FIG. 18 illustrates a perspective view of a catch of a main latch and a rod of a main striker in a vehicle door opening and closing apparatus according to an exemplary embodiment of the present disclosure.

Referring to FIG. 18, the vehicle door opening and closing apparatus, according to exemplary embodiments of the present disclosure, may include the main latch 180 including the catch 181 rotating around a shaft 183 extending in the height direction (that is, vertical direction) of the vehicle, and the main striker 190 including the rod 191 extending in the height direction (that is, vertical direction) of the vehicle. As the rod 191 of the main striker 190 extends vertically, the position of the rod 191 may be aligned with both the swing trajectory T1 and the sliding trajectory T2. Accordingly, even when any one mode of the swing mode and the sliding mode is selected, the good opening/closing quality of the vehicle door 5 may be normally achieved.

The vehicle door 5 may have a plurality of peripheral faces facing the door frame area 8 of the vehicle body 1, and the main latch 180 may be mounted on any one of the plurality of peripheral faces. Referring to FIG. 18, the vehicle door 5 may have a rear peripheral face 5a facing the rear of the vehicle, and a recessed surface 118 may be recessed from the rear peripheral face 5a of the vehicle door 5 toward the interior of the vehicle door 5 so that a recessed space 117 may be defined between the rear peripheral face 5a and the recessed surface 118. The main latch 180 may be mounted on the recessed surface 118 of the vehicle door 5. In particular, the main latch 180 may be mounted on the recessed surface 118 formed in the rear peripheral face 5a so as not to protrude from the rear peripheral face 5a of the vehicle door 5. A portion of the catch 181 may protrude from the recessed surface 118 and be located in the recessed space 117 so that the catch 181 may be covered in the recessed space 117. The catch 181 may not protrude from the rear peripheral face 5a of the vehicle door 5 toward the exterior of the vehicle door 5.

Referring to FIG. 18, a slot 119 may be formed in the recessed surface 118, and the catch 181 may rotate around the shaft 183 in the slot 119. The shaft 183 may extend in the height direction (that is, vertical direction) of the vehicle, and accordingly the longitudinal axis VT1 of the shaft 183 may extend in the height direction of the vehicle, and the catch 181 may rotate around the longitudinal axis VT1 of the shaft 183. Thus, the longitudinal axis VT1 of the shaft 183 may be a rotation axis of the catch 181. The catch 181 may be disposed rotatably between an upper support plate 186 and a lower support plate 187, and the shaft 183 may be mounted on the upper support plate 186 and the lower support plate 187. Each of the support plates 186 and 187 may have a plane perpendicular to the longitudinal axis VT1 of the shaft 183. The upper support plate 186 and the lower support plate 187 may be disposed in the interior of the vehicle door 5 adjacent to the recessed surface 118 of the vehicle door 5.

Figure 19:
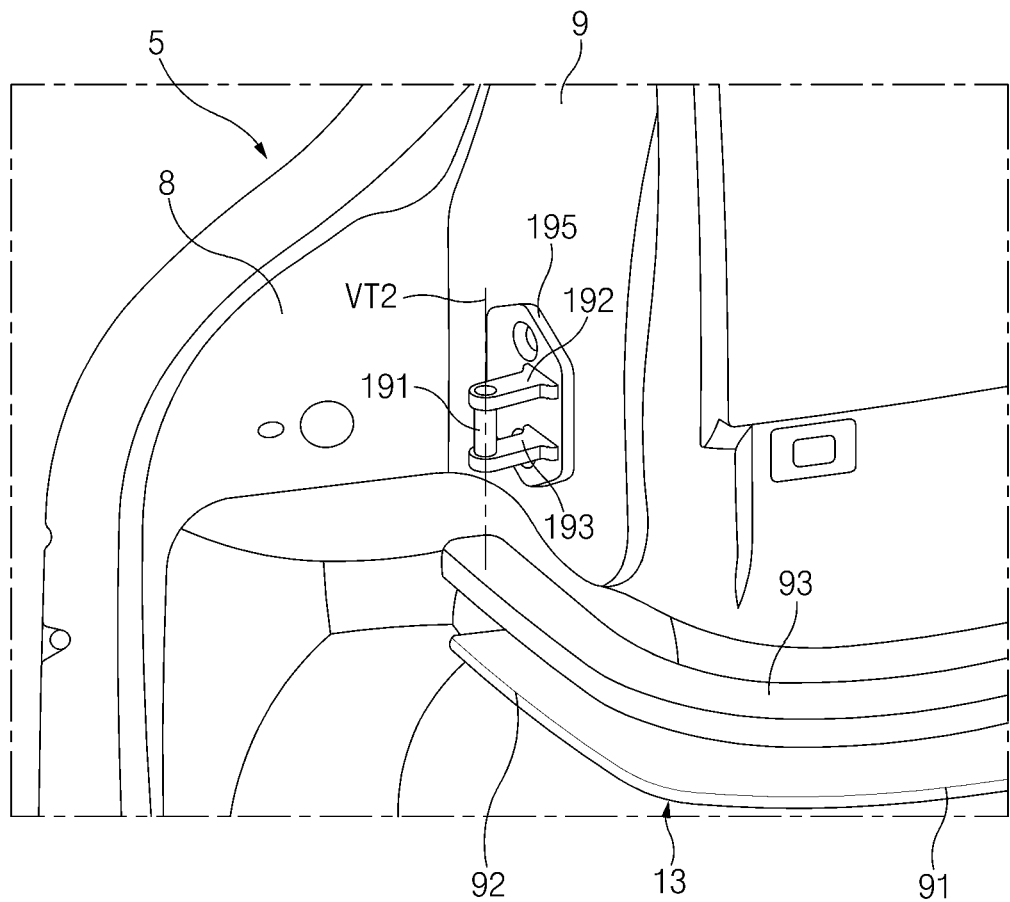
FIG. 19 illustrates a perspective view of a main striker mounted on a vehicle body in a vehicle door opening and closing apparatus according to an exemplary embodiment of the present disclosure.

Referring to FIG. 19, the main striker 190 may be mounted on a peripheral face 9 of the vehicle body 1 adjacent to the door frame area 8 of the vehicle body 1, and the main striker 190 may face the door opening 3. The main striker 190 may be located adjacent to the front portion of the center rail 13, and the main striker 190 may be located above the swing guide 92 of the center rail 13. The main striker 190 may include the rod 191 extending in the height direction (vertical direction) of the vehicle, and a longitudinal axis VT2 of the rod 191 may extend in the height direction (vertical direction) of the vehicle. The rod 191 may be connected to a mounting plate 195 through an upper extension portion 192 and a lower extension portion 193, and the mounting plate 195 may be fixed to the peripheral face 9 adjacent to the door frame area 8 of the vehicle body 1 using fasteners, welding, and/or the like. The upper extension portion 192 may extend from the mounting plate 195 to an upper end of the rod 191, and the upper end of the rod 191 may be fixed to a front portion of the upper extension portion 192. The lower extension portion 193 may extend from the mounting plate 195 to a lower end of the rod 191, and the lower end of the rod 191 may be fixed to a front portion of the lower extension portion 193. A longitudinal axis of the upper extension portion 192 may be parallel to a longitudinal axis of the lower extension portion 193.

Figure 17:
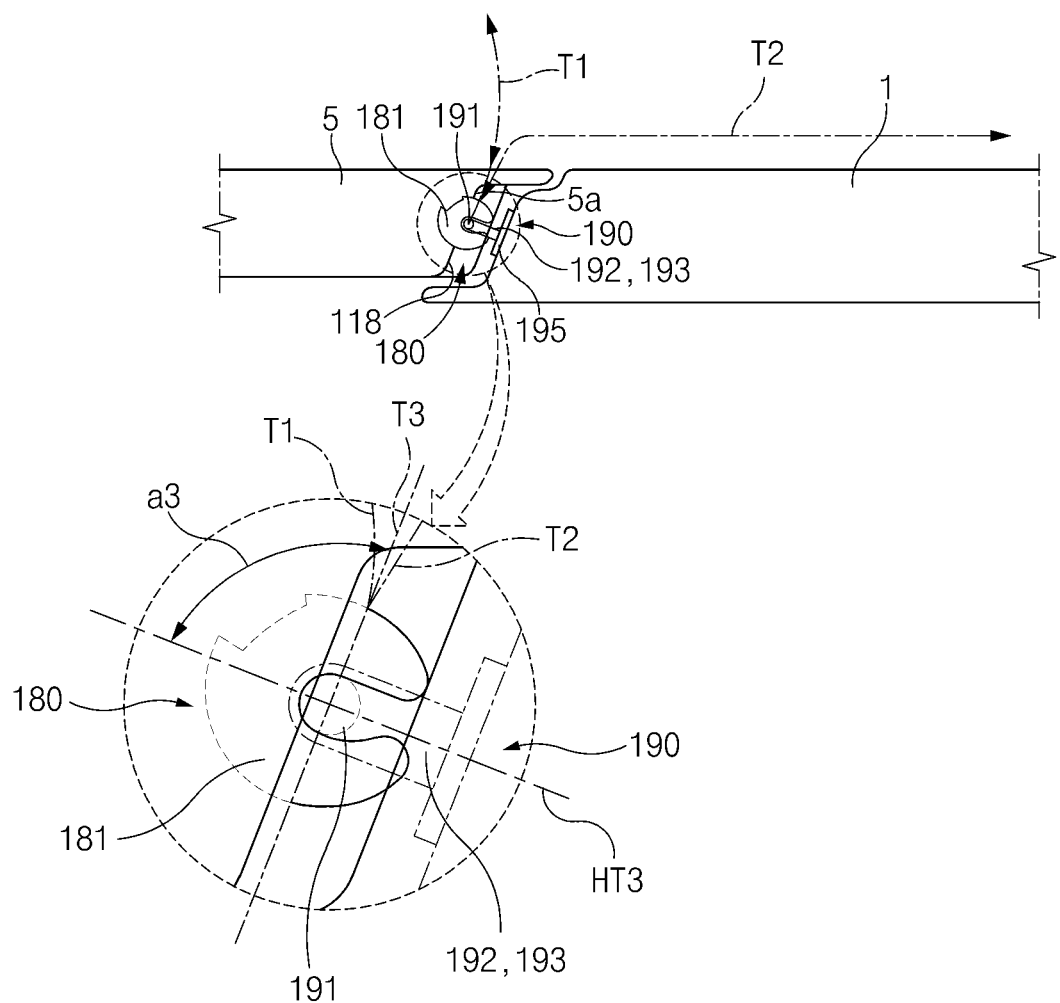
FIG. 17 illustrates a swing trajectory and a sliding trajectory of a vehicle door in a structure of a vehicle door opening and closing apparatus according to an exemplary embodiment of the present disclosure in which a catch of a main latch rotates around a vertically extending rotation axis, and a longitudinal axis of a rod of a main striker extends vertically.

Referring to FIG. 18, the rotation axis of the catch 181, that is, the longitudinal axis VT1 of the shaft 183 may be parallel to the longitudinal axis VT2 of the rod 191 of the main striker 190. The rotation axis of the catch 181 and the longitudinal axis VT2 of the rod 191 may extend vertically, and the rotation axis of the catch 181 and the longitudinal axis VT2 of the rod 191 may be parallel to each other, as illustrated in FIG. 17, the position of the main striker 190 may be determined so that the swing trajectory T1 and the sliding trajectory T2 may meet a center point of the rod 191 of the main striker 190. Accordingly, an angle a3 between a common tangent T3 between the swing trajectory T1 and the sliding trajectory T2 and a longitudinal axis HT3 of the upper extension portion 192 may be a right angle. Even when the vehicle door 5 is closed in any one of the swing mode or the sliding mode, the catch 181 may engage with the rod 191 of the main striker 190 at the same position and the same contact angle.

Figure 20:
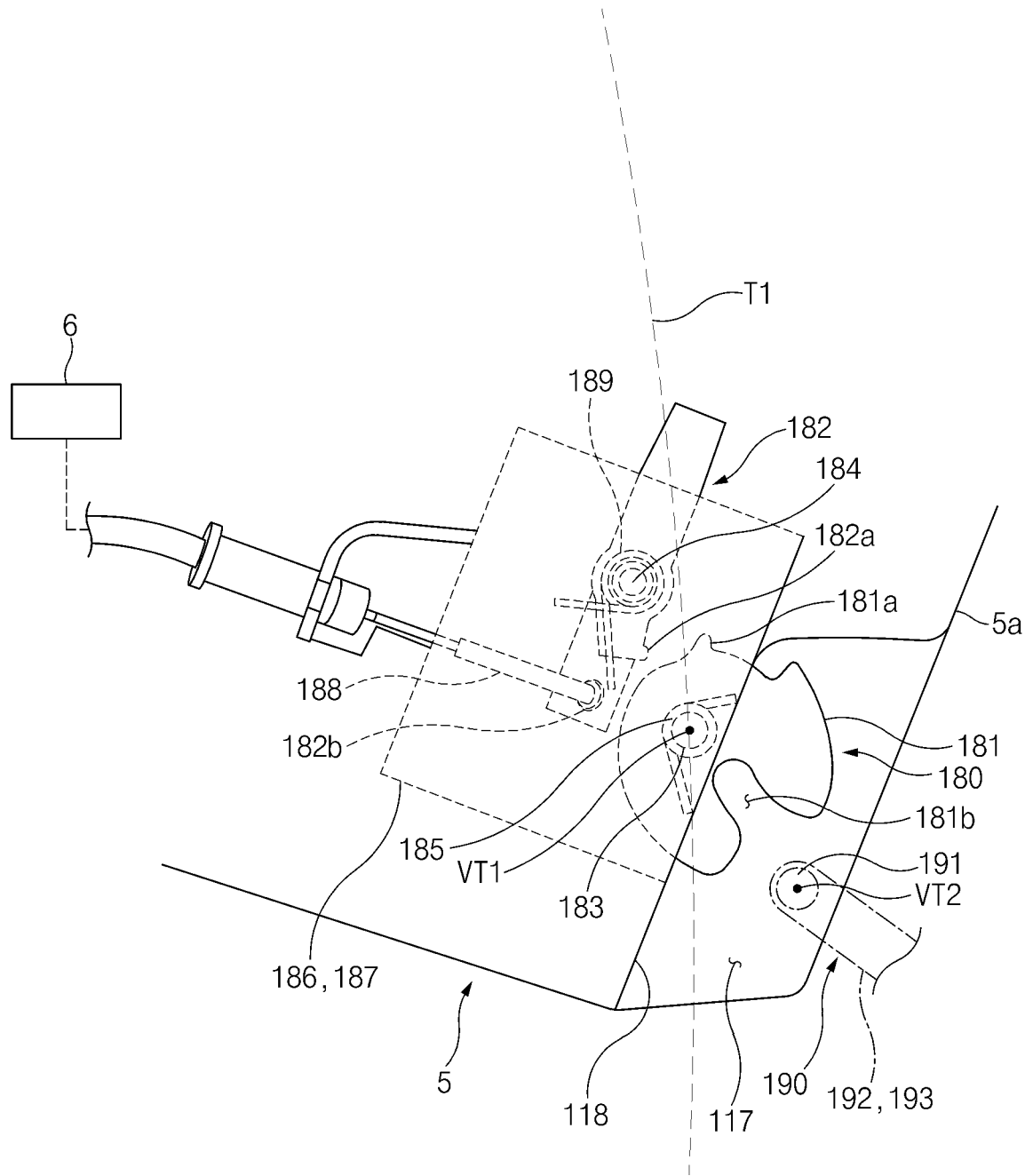
FIG. 20 illustrates a state before a catch of a main latch locks a rod of a main striker before a vehicle door is closed along a swing trajectory in a vehicle door opening and closing apparatus according to an exemplary embodiment of the present disclosure.

Referring to FIG. 20, the catch 181 may have a locking shoulder 181a and a slot 181b, which is open to the rod 191 of the main striker 190. The slot 181b may receive the rod 191 of the main striker 190. The catch 181 may releasably lock the rod 191 of the main striker 19o. As the catch 181 rotates around the shaft 183, the catch 181 may move between an open position (see FIGS. 20 and 22) in which the slot 181b of the catch 181 is opened to the rod 191 and a locking position (see FIGS. 21 and 23) in which the rod 191 is held in the slot 181b.

Figure 22:
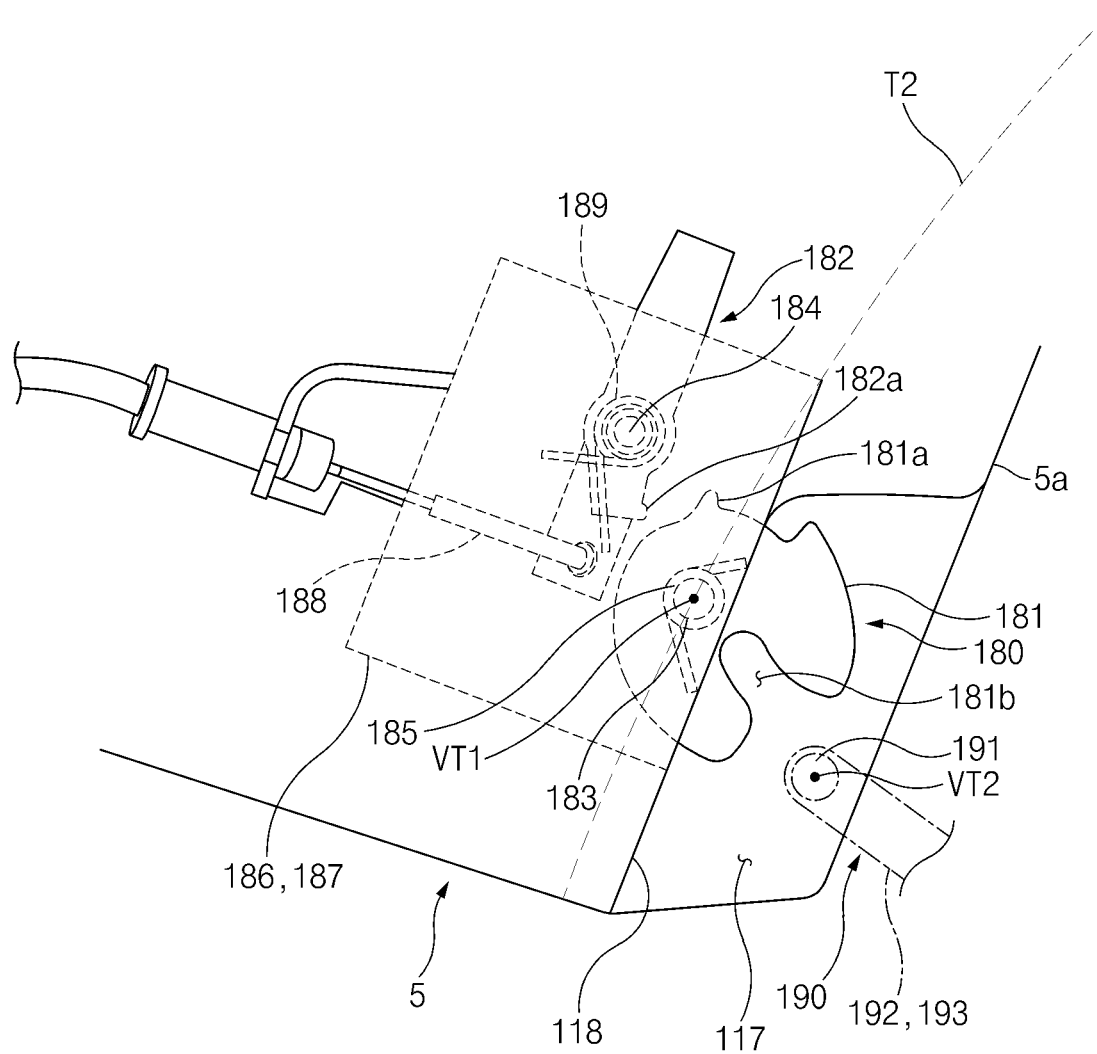
FIG. 22 illustrates a state before a catch of a main latch locks a rod of a main striker before a vehicle door is closed along a sliding trajectory in a vehicle door opening and closing apparatus according to an exemplary embodiment of the present disclosure.

Referring to FIGS. 20 and 22, when the catch 181 is in the open position, the slot 181b, may be opened to the rod 191 of the main striker 190 so that the rod 191 may be received in or be disengaged from the slot 181b of the catch 181. The catch 181 may be biased toward the open position by a biasing element 185 such as a torsion spring, and the biasing element 185 may be disposed around the shaft 183.

Figure 21:
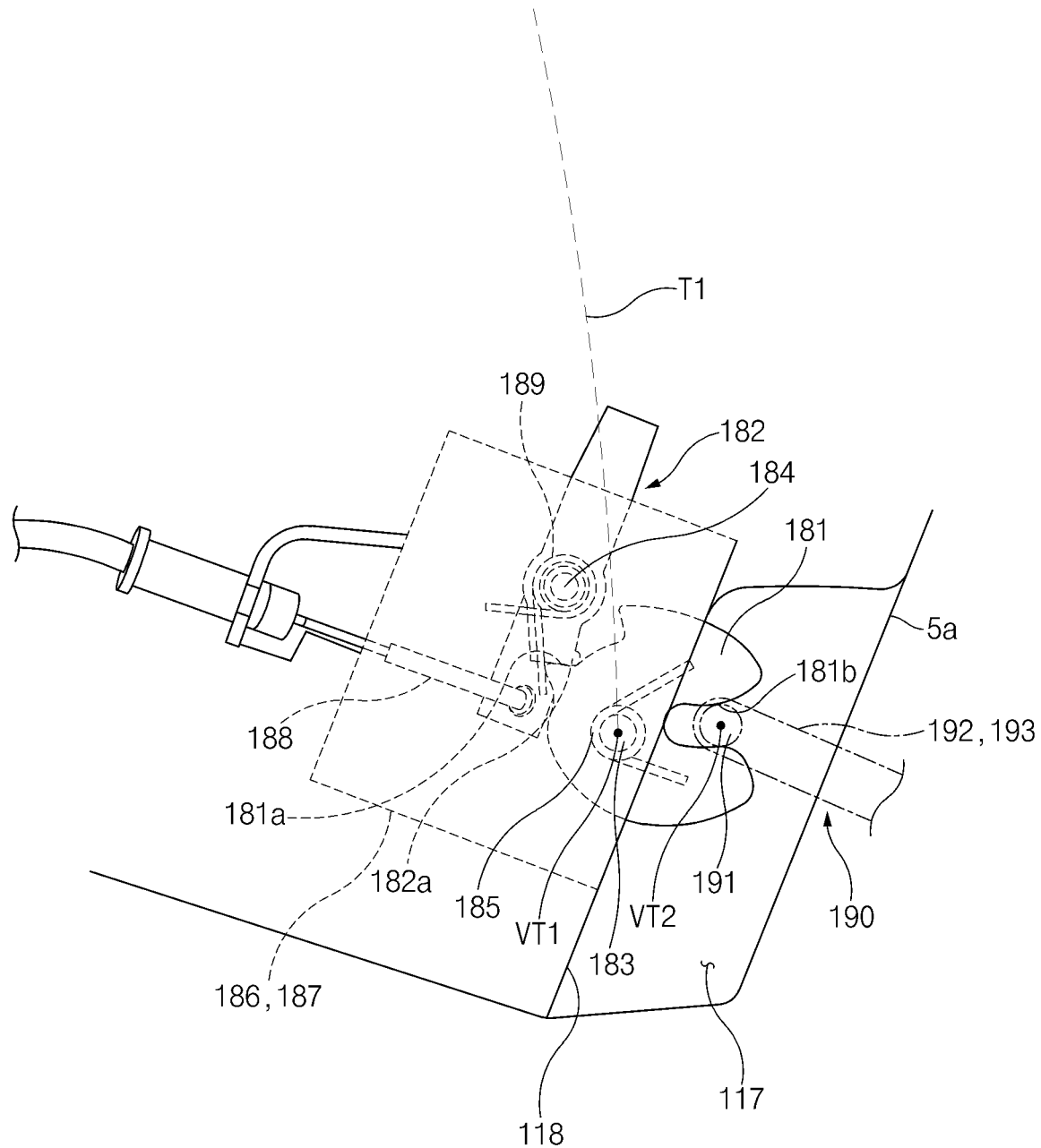
FIG. 21 illustrates a state in which a catch of a main latch locks a rod of a main striker when a vehicle door is closed along a swing trajectory in a vehicle door opening and closing apparatus according to an exemplary embodiment of the present disclosure.
Figure 23:
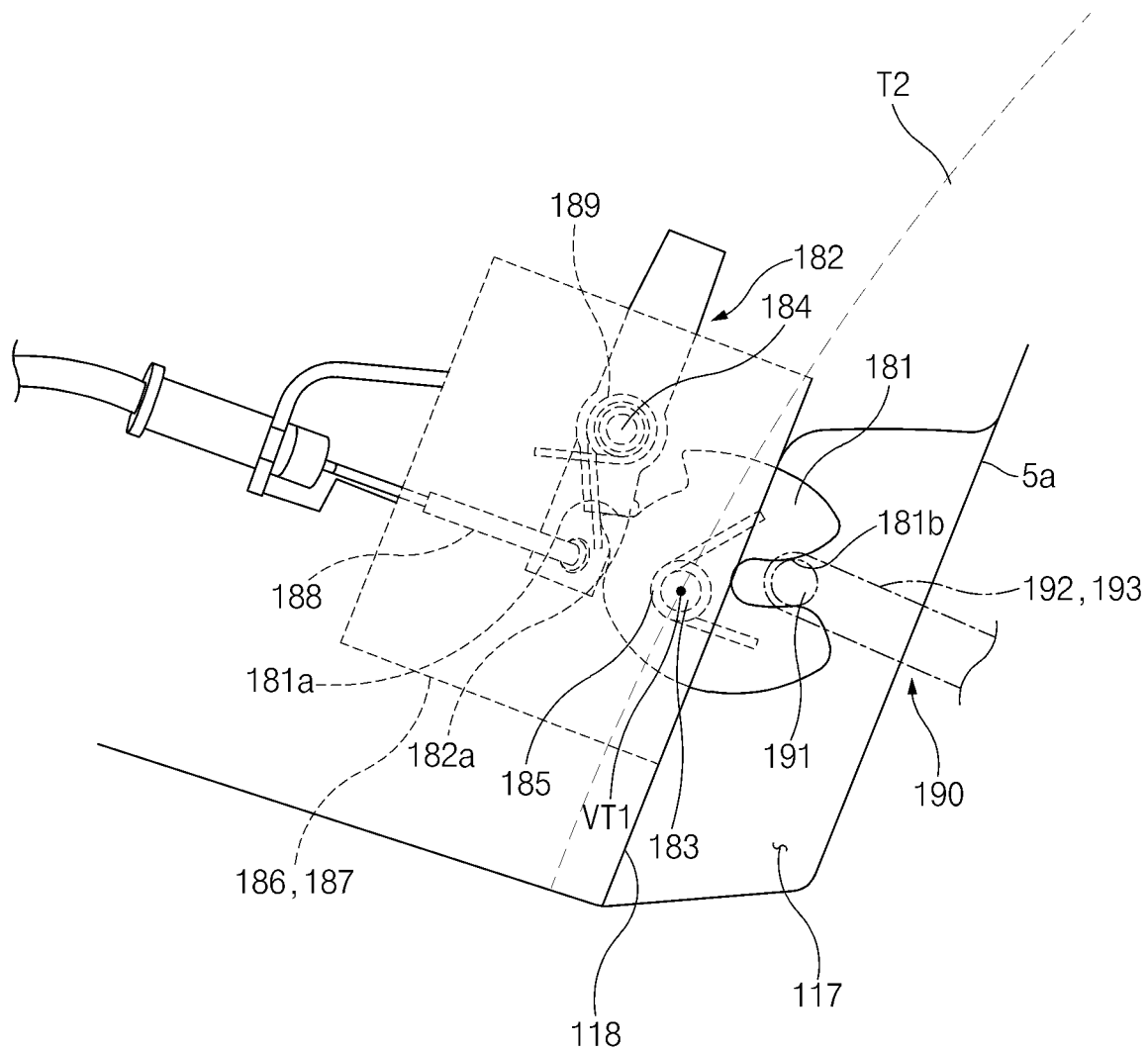
FIG. 23 illustrates a state in which a catch of a main latch locks a rod of a main striker when a vehicle door is closed along a sliding trajectory in a vehicle door opening and closing apparatus according to an exemplary embodiment of the present disclosure.

As illustrated in FIGS. 21 and 23, when the vehicle door 5 is closed, the slot 181b may cooperate with the rod 191 so that the rod 191 of the main striker 190 may be received in the slot 181b of the catch 181. The rod 191 of the main striker 190 may force the catch 181 to move (rotate) toward the locking position, and accordingly the rod 191 may be held in the slot 181b of the catch 181, and the rod 191 may be prevented from being disengaged from the slot 181b of the catch 181.

Referring to FIG. 20, the main latch 180 may include a lever 182 operatively connected to the catch 181. The lever 182 may rotate around a lever pin 184, and a longitudinal axis of the lever pin 184 may extend in the height direction (that is, vertical direction) of the vehicle. The longitudinal axis of the lever pin 184 may be parallel to the longitudinal axis of the shaft 183. The lever pin 184 may be mounted on the upper support plate 186 and the lower support plate 187. The lever 182 may have a locking projection 182a engageable with the locking shoulder 181a of the catch 181, and a hole 182b to which an end portion of a cable 188 is fixed. The lever 182 may be connected to the outside handle 6 through the cable 188.

As the lever 182 rotates around the lever pin 184, the lever 182 may move between an engageable position and a release position.

When the lever 182 is in the engageable position, the locking projection 182a of the lever 182 may engage with the locking shoulder 181a of the catch 181 (see FIGS. 21 and 23) as the catch 181 rotates. The lever 182 may be biased toward the engageable position by a biasing element 189 such as a torsion spring. The biasing element 189 may be disposed around the lever pin 184 to apply a biasing force to the lever 182.

As illustrated in FIGS. 21 and 23, when the vehicle door 5 is closed, the slot 181b of the catch 181 may receive the rod 191 of the main striker 190 so that the catch 181 may move (rotate) to the locking position, and the locking projection 182a of the lever 182 may engage with the locking shoulder 181a of the catch 181 so that the catch 181 may be held in the locking position.

When the lever 182 is in the release position, the locking projection 182a of the lever 182 may push the locking shoulder 181a of the catch 181 so that the locking projection 182a of the lever 182 may be released from the locking shoulder 181a of the catch 181. When the cable 188 is pulled by the operation of the outside handle 6 in a state in which the locking projection 182a of the lever 182 engages with the locking shoulder 181a of the catch 181, the lever 182 may rotate in a direction opposite to the direction in which the biasing force is applied by the biasing element 189, and accordingly the locking projection 182a of the lever 182 may push the locking shoulder 181a of the catch 181 so that the locking projection 182a of the lever 182 may be released from the locking shoulder 181a of the catch 181.

FIG. 20 illustrates a state before the vehicle door 5 is closed in a state in which the vehicle door 5 is opened in the swing mode. Referring to FIG. 20, the vehicle door 5 may move toward the vehicle body along the swing trajectory T1, and the catch 181 of the main latch 180 may not yet engage with the rod 191 of the main striker 190 before the vehicle door 5 is closed in the swing mode. The catch 181 may be held in the open position by the biasing element 185, and the lever 182 may be held in the engageable position by the biasing element 189.

FIG. 21 illustrates a state in which the vehicle door 5 is closed in the swing mode. Referring to FIG. 21, when the vehicle door 5 is closed in the swing mode, the rod 191 of the main striker 190 may be received in the slot 181b, of the catch 181 so that the catch 181 may engage with the rod 191. As the catch 181 moves to the locking position, the locking projection 182a of the lever 182 may engage with the locking shoulder 181a of the catch 181.

FIG. 22 illustrates a state before the vehicle door 5 is closed in a state in which the vehicle door 5 is opened in the sliding mode. Referring to FIG. 22, the vehicle door 5 may move toward the vehicle body along the sliding trajectory T2, and the catch 181 of the main latch 180 may not yet engage with the rod 191 of the main striker 190 before the vehicle door 5 is closed in the sliding mode. The catch 181 may be held in the open position by the biasing element 185, and the lever 182 may be held in the engageable position by the biasing element 189.

FIG. 23 illustrates a state in which the vehicle door 5 is closed in the sliding mode. Referring to FIG. 23, when the vehicle door 5 is closed in the sliding mode, the rod 191 of the main striker 190 may be received in the slot 181b, of the catch 181 so that the catch 181 may engage with the rod 191. As the catch 181 moves to the locking position, the locking projection 182a of the lever 182 may engage with the locking shoulder 181a of the catch 181.

Figure 24:
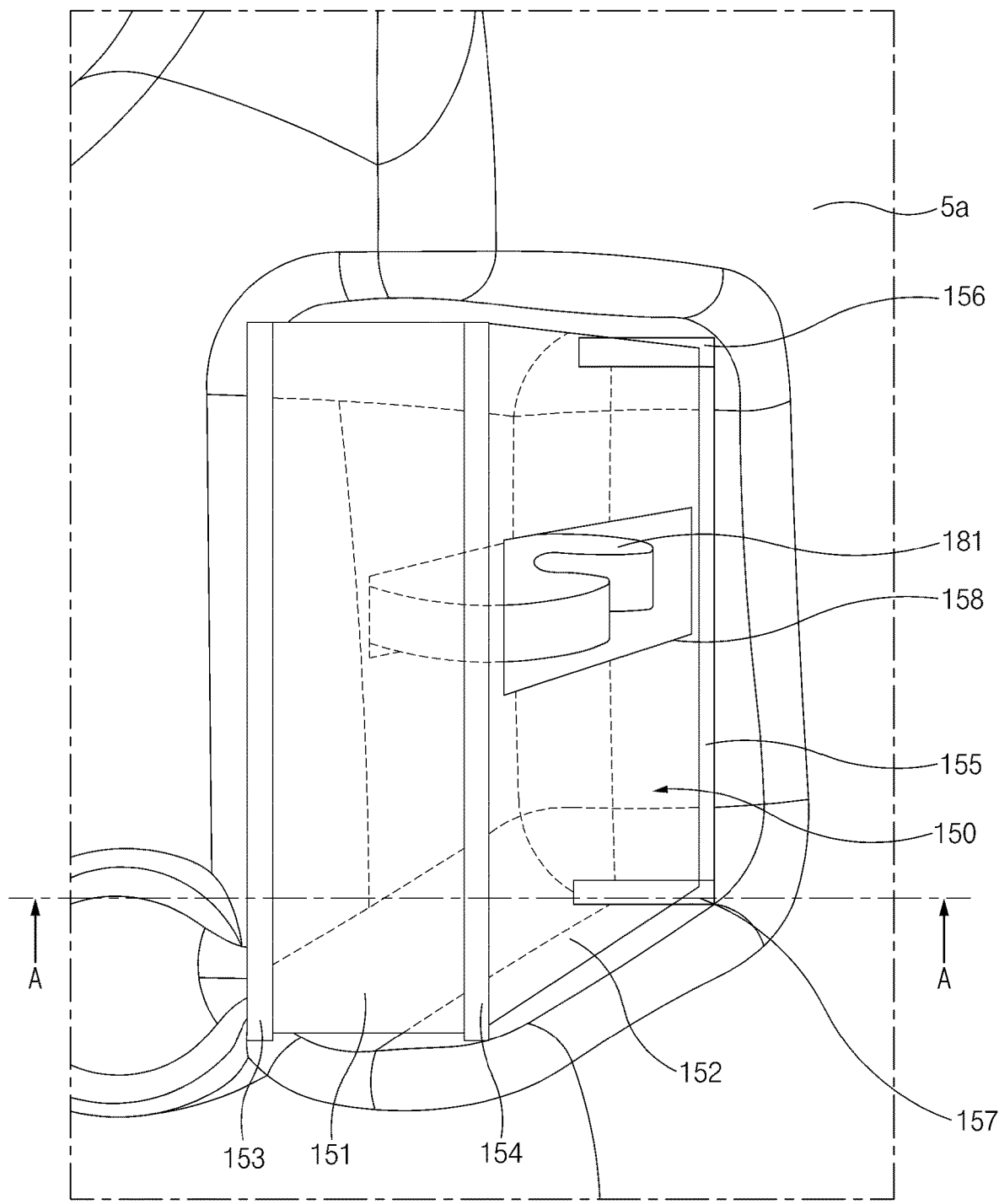
FIG. 24 illustrates a perspective view of a protector mounted on a vehicle door in a vehicle door opening and closing apparatus according to an exemplary embodiment of the present disclosure.
Figure 25:
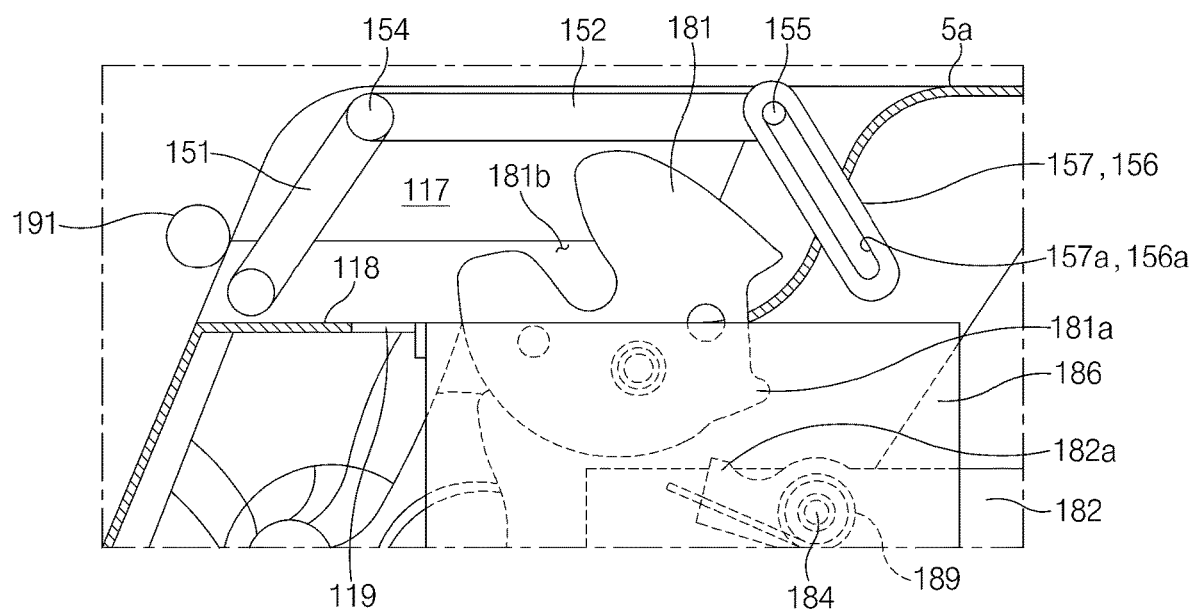
FIG. 25 illustrates a cross-sectional view of a state in which a protector covers a recessed space of a vehicle door, taken along line A-A of FIG. 24.
Figure 26:
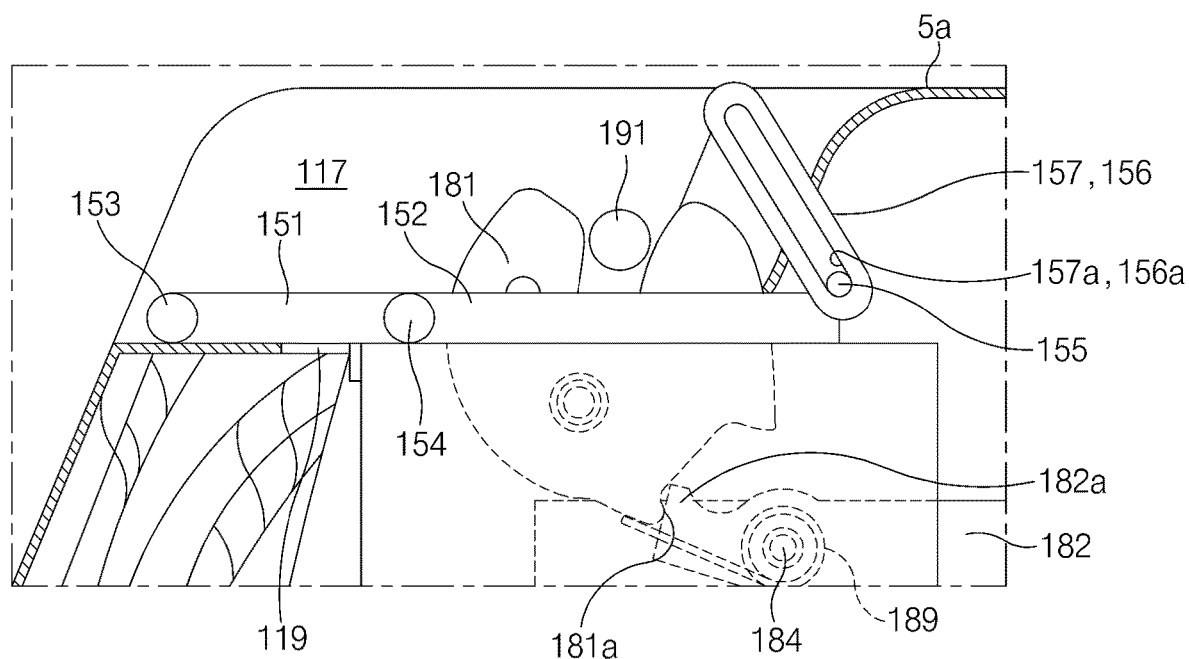
FIG. 26 illustrates a state in which a protector exposes a recessed space of a vehicle door in a vehicle door opening and closing apparatus according to an exemplary embodiment of the present disclosure.

Referring to FIGS. 24 to 26, the vehicle door opening and closing apparatus, according to exemplary embodiments of the present disclosure, may further include a protector 150 protecting and covering the catch 181 protruding from the recessed surface 118 of the vehicle door 5.

The protector 150 may move in the recessed space 117 as the vehicle door 5 is opened and closed. When the vehicle door 5 is opened, the protector 150 may be spaced apart from the recessed surface 118 of the vehicle door 5 so that the protector 150 may cover the recessed space 117. When the vehicle door 5 is closed, the protector 150 may come into contact with or move close to the recessed surface 118 so that the catch 181 may smoothly lock the rod 191.

The protector 150 may include a first cover 151 pivotally connected to an edge of the recessed surface 118, a second cover 152 pivotally connected to the first cover 151, and a pair of guides 156 and 157 guiding the movement of the second cover 152.

The first cover 151 may be pivotally connected to the edge of the recessed surface 118 through a first pivot pin 153. The second cover 152 may have a first end portion and a second end portion opposing each other. The first end portion of the second cover 152 may be pivotally connected to the first cover 151 through a second pivot pin 154. A guide pin 155 may be provided on the second end portion of the second cover 152. The second cover 152 may have an opening 158 in which the catch 181 is received.

The pair of guides 156 and 157 may be located opposite to the first pivot pin 153, and the pair of guides 156 and 157 may be spaced apart from each other by a distance corresponding to a width of the second cover 152. The guides 156 and 157 may have guide slots 156a and 157a guiding corresponding end portions of the guide pin 155, respectively. The first cover 151 and the second cover 152 may be held spaced apart from the recessed surface 118 by a torsion spring (not shown), and the torsion spring may be disposed around the second pivot pin 154.

Referring to FIG. 25, the rod 191 of the main striker 190 may be spaced apart from the protector 150 before the vehicle door 5 is opened or the vehicle door 5 is closed. The first cover 151 and the second cover 152 of the protector 150 may completely cover the recessed space 117, and accordingly the catch 181 may be protected and covered by the protector iso. When the vehicle door 5 is opened, the protector 150 may completely cover the recessed space 117 to prevent the catch 181 from being contaminated, and to prevent the user or occupant from being injured by the catch 181 protruding from the recessed surface 118.

Referring to FIG. 26, when the vehicle door 5 is closed, the rod 191 of the main striker 190 may press the protector 150 so that the first cover 151 and the second cover 152 may come into contact with or move close to the recessed surface 118. Accordingly, the first cover 151 and the second cover 152 of the protector 150 may uncover the recessed space 117, and the catch 181 may be exposed through the opening 158 of the second cover 152 so that the catch 181 may lock the rod 191.

According to the exemplary embodiments illustrated in FIGS. 17 to 26, the catch 181 of the main latch 180 may rotate around the axis VT1 extending in the height direction (that is, vertical direction) of the vehicle, and the rod 191 of the main striker 190 may extend in the height direction (that is, vertical direction) of the vehicle so that the catch 181 and the rod 191 may be aligned perpendicular to both the swing trajectory T1 and the sliding trajectory T2. Accordingly, even when the vehicle door 5 is opened and closed in any one mode of the swing mode and the sliding mode, abnormal noise, impacts, vibrations, and the like may not be generated, and a reduction in durability may be prevented.

FIGS. 1 to 26 illustrate the vehicle door opening and closing apparatus according to exemplary embodiments of the present disclosure applied to the rear door 5. However, the vehicle door opening and closing apparatus according to exemplary embodiments of the present disclosure may be applied to various vehicle doors, such as front doors, in addition to rear doors.

Figure 27:
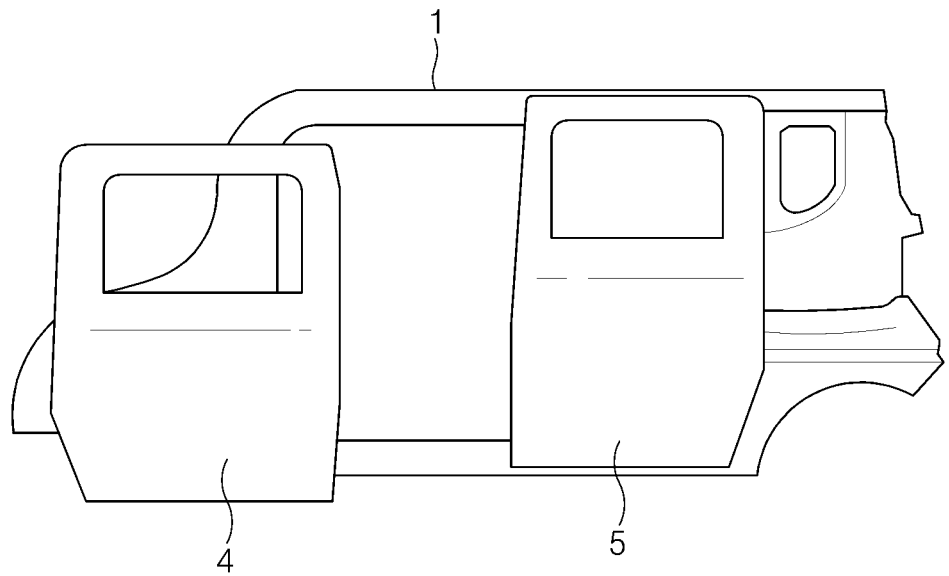
FIG. 27 illustrates a vehicle door opening and closing apparatus according to an exemplary embodiment of the present disclosure, which is applied to a front door of a vehicle, in a state in which the front door is opened in a sliding mode.
Figure 28:
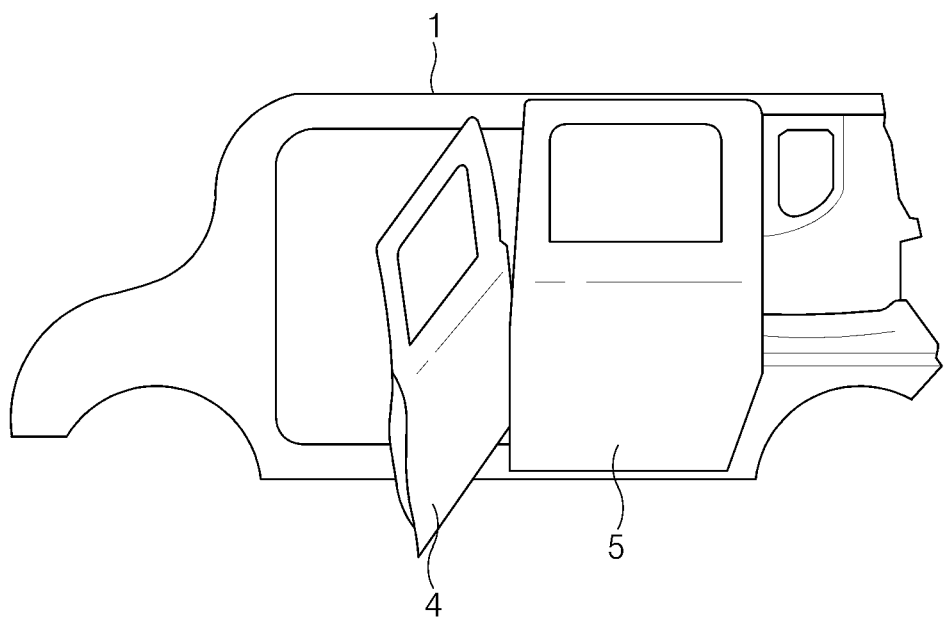
FIG. 28 illustrates a state in which the front door of FIG. 27 is opened in a swing mode.

FIGS. 27 and 28 illustrate the vehicle door opening and closing apparatus according to exemplary embodiments of the present disclosure applied to the front door 4. FIG. 27 illustrates a state in which the front door 4 is opened in the sliding mode, and FIG. 28 illustrates a state in which the front door 4 is opened in the swing mode.

Figure 29:
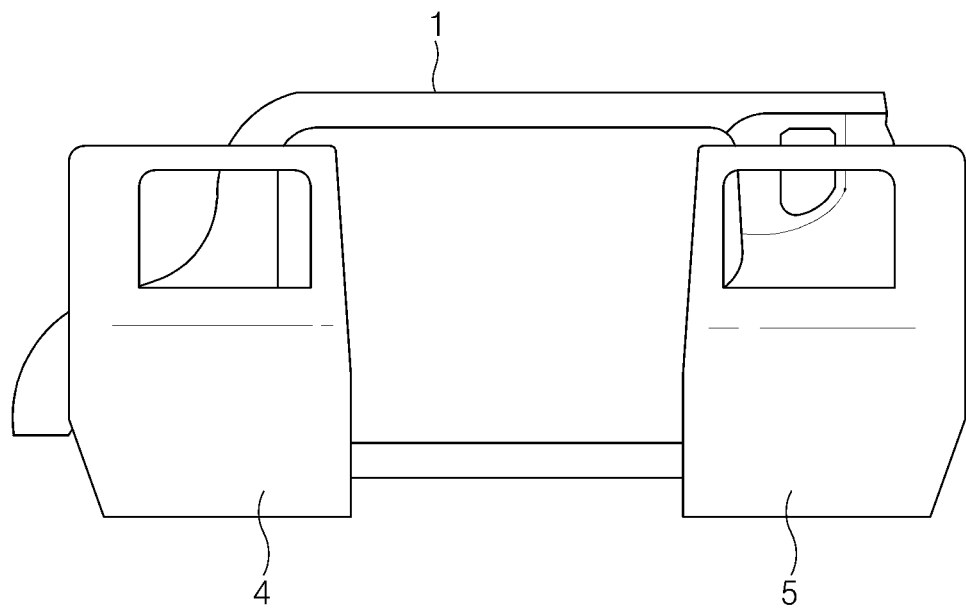
FIG. 29 illustrates a vehicle door opening and closing apparatus according to an exemplary embodiment of the present disclosure, which is applied to a front door and a rear door of a vehicle, in a state in which the front door and the rear door are opened in a sliding mode.
Figure 30:
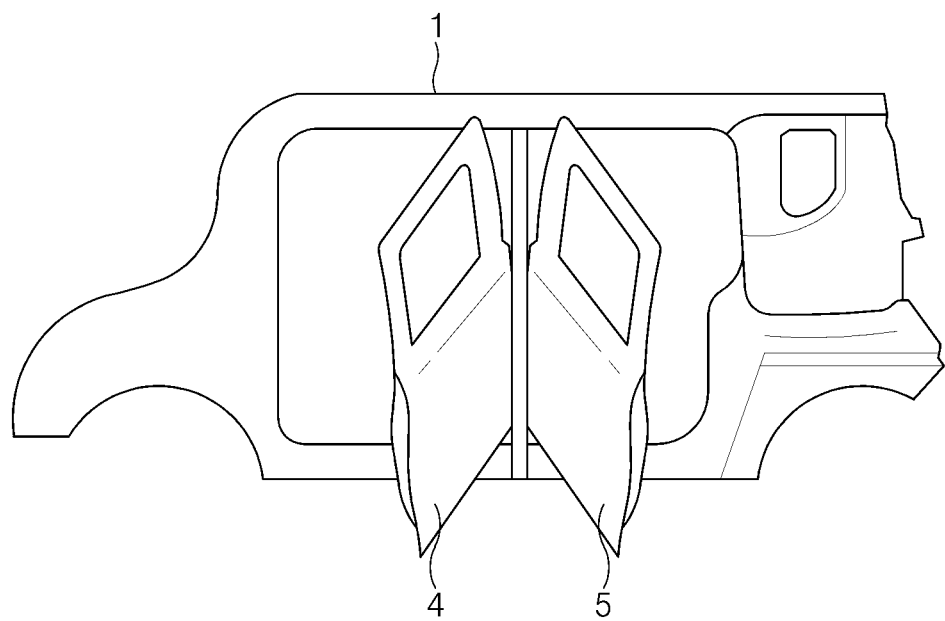
FIG. 30 illustrates a state in which the front door and the rear door of FIG. 29 are opened in a swing mode.

FIGS. 29 and 30 illustrate the vehicle door opening and closing apparatus according to exemplary embodiments of the present disclosure applied to both the front door 4 and the rear door 5. FIG. 29 illustrates a state in which the front door 4 and the rear door 5 are opened in the sliding mode, and FIG. 30 illustrates a state in which the front door 4 and the rear door 5 are opened in the swing mode.

As set forth above, the vehicle door opening and closing apparatus according to exemplary embodiments of the present disclosure may selectively switch the opening/closing operation of the vehicle door into the sliding mode and the swing mode, thereby meeting the needs of users such as convenience and diversity. By selecting the opening/closing operation of the vehicle door depending on the user's situation and environment, convenience and quality may be improved. In particular, the opening/closing operation of the vehicle door may be performed in any one mode selected from the sliding mode and the swing mode depending on the user's situation (location, time, purpose of use, etc.), environment (weather, season, etc.), the occupants' ages (children, adults, the elderly, etc.), and the like, and thus improved ease of use may be achieved. For example, when the vehicle is stopped on the roadside, the swing mode may be selected so that the occupants of all ages may quickly open and close the vehicle door with relatively little force. The sliding mode may be selected in a narrow space such as a parking lot so that a space for ingress and egress of the occupants may be relatively large, which enables quick ingress and egress of the occupants of all ages. The sliding mode may be selected for the ingress and egress of occupants such as small children, the elderly, and the disabled so that a relatively large space for ingress and egress may be provided to those vulnerable occupants. When vehicles are used for camping, loading cargo, etc., the sliding mode may be selected to improve ease of use.

According to exemplary embodiments of the present disclosure, the catch of the main latch may rotate around the axis extending in the height direction (vertical direction) of the vehicle and the rod of the main striker may extend in the height direction (vertical direction) of the vehicle so that the catch and the rod may be aligned perpendicular to both the swing trajectory and the sliding trajectory. Accordingly, even when the vehicle door is opened and closed in any one mode of the swing mode and the sliding mode, abnormal noise, impacts, vibrations, and the like may not be generated, and a reduction in durability may be prevented.

In terms of vehicle specifications, the vehicle door opening and closing structure may be standardized, regardless of vehicle models. Thus, the manufacturing cost and investment cost may be significantly reduced.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A vehicle door opening and closing apparatus, comprising:
    a main latch mounted on a vehicle door, and including a catch rotating around a shaft extending in a height direction of a vehicle;
    a main striker mounted on a vehicle body, and including a rod extending in the height direction of the vehicle;
    a recessed surface which is recessed from a peripheral face of the vehicle door toward an interior of the vehicle door;
    a recessed space defined between the peripheral face and the recessed surface; and
    a protector covering or uncovering the recessed space, wherein:
        a portion of the catch protrudes from the recessed surface, and is located in the recessed space, and
        the protector includes:
            a first cover pivotally connected to an edge of the recessed surface,
            a second cover pivotally connected to the first cover, and
            a pair of guides configured to guide a movement of the second cover.

2. The vehicle door opening and closing apparatus according to claim 1, wherein the vehicle door is configured to be selectively opened and closed in any one of a sliding mode and a swing mode so that the vehicle door uncovers and covers a door opening of the vehicle body.

3. The vehicle door opening and closing apparatus according to claim 1, wherein a longitudinal axis of the shaft is parallel to a longitudinal axis of the rod.

4. The vehicle door opening and closing apparatus according to claim 1, wherein:
    the main latch includes a lever operatively connected to the catch, and
    the lever rotates around a lever pin.

5. The vehicle door opening and closing apparatus according to claim 4, wherein a longitudinal axis of the lever pin is parallel to a longitudinal axis of the shaft.

6. The vehicle door opening and closing apparatus according to claim 4, wherein:
    the catch has a locking shoulder and a slot in which the rod is received, and
    the lever has a locking projection releasably engaged with the locking shoulder.

7. The vehicle door opening and closing apparatus according to claim 1, wherein the catch is rotatable between an upper support plate and a lower support plate.

8. The vehicle door opening and closing apparatus according to claim 7, wherein the shaft is mounted on the upper support plate and the lower support plate.

9. The vehicle door opening and closing apparatus according to claim 7, wherein each of the upper support plate and the lower support plate has a plane perpendicular to a longitudinal axis of the shaft.

10. The vehicle door opening and closing apparatus according to claim 1, wherein the main striker includes an upper extension portion connected to an upper end of the rod, a lower extension portion connected to a lower end of the rod, and a mounting plate to which the upper extension portion and the lower extension portion are fixed.

11. The vehicle door opening and closing apparatus according to claim 1, wherein:
a first end portion of the second cover is pivotally connected to the first cover through a second pivot pin,
a guide pin is provided on a second end portion of the second cover, and
the guide pin is guided along the pair of guides.

12. The vehicle door opening and closing apparatus according to claim 11, wherein each guide has a guide slot configured to guide a corresponding end portion of the guide pin.

13. A method, comprising:
mounting a main latch on a vehicle door, the main latch including a catch rotating around a shaft extending in a height direction of a vehicle; and
mounting a main striker on a vehicle body, the main striker including a rod extending in the height direction of the vehicle, wherein:
the vehicle door has a recessed surface which is recessed from a peripheral face of the vehicle door toward an interior of the vehicle door,
a recessed space is defined between the peripheral face and the recessed surface,
a portion of the catch protrudes from the recessed surface, and is located in the recessed space,
a protector is configured to cover or uncover the recessed space, the protector including:
a first cover pivotally connected to an edge of the recessed surface,
a second cover pivotally connected to the first cover, and
a pair of guides configured to guide a movement of the second cover.

14. The method according to claim 13, wherein the vehicle door is configured to be selectively opened and closed in any one of a sliding mode and a swing mode so that the vehicle door uncovers and covers a door opening of the vehicle body.

15. The method according to claim 13, wherein a longitudinal axis of the shaft is parallel to a longitudinal axis of the rod.

16. The method according to claim 13, further comprising mounting the shaft on an upper support plate and a lower support plate, wherein the catch is rotatable between the upper support plate and the lower support plate.

17. The method according to claim 16, wherein each of the upper support plate and the lower support plate has a plane perpendicular to a longitudinal axis of the shaft.

18. A vehicle comprising:
a vehicle door opening and closing apparatus, comprising:
a main latch mounted on a vehicle door, and including a catch rotating around a shaft extending in a height direction of the vehicle;
a main striker mounted on a vehicle body, and including a rod extending in the height direction of the vehicle;
a recessed surface which is recessed from a peripheral face of the vehicle door toward an interior of the vehicle door;
a recessed space defined between the peripheral face and the recessed surface; and a protector covering or uncovering the recessed space, wherein:
a portion of the catch protrudes from the recessed surface, and is located in the recessed space, and
the protector includes:
a first cover pivotally connected to an edge of the recessed surface,
a second cover pivotally connected to the first cover, and
a pair of guides configured to guide a movement of the second cover.

19. The vehicle according to claim 18, wherein the vehicle door is configured to be selectively opened and closed in any one of a sliding mode and a swing mode so that the vehicle door uncovers and covers a door opening of the vehicle body.

20. The vehicle according to claim 18, wherein a longitudinal axis of the shaft is parallel to a longitudinal axis of the rod.

* * * * *